(12) United States Patent
Ramos-Stanbury et al.

(10) Patent No.: US 12,496,264 B2
(45) Date of Patent: Dec. 16, 2025

(54) PROCESS FOR TREATING HUMAN TRANSPIRATION USING A CATION AND AN ANION IN PRESENCE OF A MODULATOR

(71) Applicant: L'OREAL, Paris (FR)

(72) Inventors: Laure Ramos-Stanbury, Sceaux (FR); Jean-Baptiste Galey, Aulnay sous Bois (FR)

(73) Assignee: L'OREAL, Paris (FR)

( * ) Notice: Subject to any disclaimer, the term of this patent is extended or adjusted under 35 U.S.C. 154(b) by 0 days.

(21) Appl. No.: 16/754,203

(22) PCT Filed: Oct. 9, 2018

(86) PCT No.: PCT/EP2018/077450
§ 371 (c)(1),
(2) Date: Apr. 7, 2020

(87) PCT Pub. No.: WO2019/072831
PCT Pub. Date: Apr. 18, 2019

(65) Prior Publication Data
US 2020/0276091 A1 Sep. 3, 2020

(30) Foreign Application Priority Data
Oct. 9, 2017 (FR) ..................................... 17 59420

(51) Int. Cl.
| | | |
|---|---|---|
| *A61K 8/27* | (2006.01) | |
| *A61K 8/24* | (2006.01) | |
| *A61K 8/29* | (2006.01) | |
| *A61K 8/362* | (2006.01) | |
| *A61K 8/44* | (2006.01) | |
| *A61Q 15/00* | (2006.01) | |

(52) U.S. Cl.
CPC .................. *A61K 8/27* (2013.01); *A61K 8/24* (2013.01); *A61K 8/29* (2013.01); *A61K 8/362* (2013.01); *A61K 8/44* (2013.01); *A61Q 15/00* (2013.01)

(58) Field of Classification Search
CPC . A61K 8/19; A61K 8/365; A61K 8/27; A61Q 19/00
See application file for complete search history.

(56) References Cited

U.S. PATENT DOCUMENTS

| | | | |
|---|---|---|---|
| 2,118,566 A * | 5/1938 | Miles | A61K 8/24 510/130 |
| 5,152,902 A | 10/1992 | Koskan et al. | |
| 2007/0196303 A1 | 8/2007 | Li et al. | |
| 2009/0092571 A1* | 4/2009 | Hirano | A61L 9/01 424/76.1 |
| 2015/0216767 A1* | 8/2015 | McCauley | A61K 8/0208 15/104.93 |
| 2021/0228649 A1* | 7/2021 | Krueger | A61K 9/0014 |

FOREIGN PATENT DOCUMENTS

| | | | |
|---|---|---|---|
| EP | 1541122 A1 | | 6/2005 |
| FR | 3036285 A1 | | 11/2016 |
| WO | WO2013013902 | * | 1/2013 |
| WO | WO 2013/029185 A1 | | 3/2013 |
| WO | WO 2016/185113 A1 | | 11/2016 |
| WO | WO 2017/008930 A1 | | 1/2017 |

OTHER PUBLICATIONS

Berg et al., Pharmaceutical Salts, Pharmaceutical Sciences, Jan. 1977, col. 66 No. 1, p. 1-19 (Year: 1977).*

* cited by examiner

*Primary Examiner* — Mark V Stevens
(74) *Attorney, Agent, or Firm* — POLSINELLI PC

(57) ABSTRACT

This invention relates to a cosmetic method for the treatment of human perspiration and optionally body odors resulting from the perspiration, that includes the use of at least one cation $X^{n+}$ of valency n, of at least one anion $Y^{m-}$ of valency m and of at least one modulating agent.

10 Claims, No Drawings

PROCESS FOR TREATING HUMAN TRANSPIRATION USING A CATION AND AN ANION IN PRESENCE OF A MODULATOR

This invention relates to a cosmetic method for the treatment of human perspiration and optionally body odors resulting from the perspiration, that includes the use of at least one cation $X^{n+}$ of valency n, of at least one anion $Y^{m-}$ of valency m and of at least one modulating agent.

This invention in particular relates to a cosmetic method for the treatment of human perspiration and optionally body odors resulting from the perspiration, that includes
(i) either the mixing just before use of at least one composition A and of at least one composition B; said compositions A and B being packaged separately followed by the application of the resulting mixture on the surface of the skin;
(ii) or the application on the surface of the skin simultaneously or sequentially of at least one composition A and of at least one composition B packaged separately;
(iii) or the application on the surface of the skin of a composition comprising in the same support at least one composition A and of at least one composition B;
said composition A comprising in a cosmetically acceptable medium at least one cation $X^{n+}$ of valency n;
said composition B comprising in a cosmetically acceptable medium at least one anion $Y^{m-}$ of valency m;
the mixture of said composition A with said composition B comprising in addition at least one modulating agent.

The underarms as well as certain other parts of the body are generally the place of several discomforts that can stem directly or not from perspiration problems. These phenomena often cause unpleasant and uncomfortable sensations which are primarily due to the presence of sweat resulting from perspiration that can, in certain cases, make the skin moist and wet clothing, in particular at the level of the underarms or the back, as such leaving visible traces. Moreover, the presence of sweat can generate the discharging of body odors that are most of the time unpleasant. Finally, during the evaporation thereof, sweat can also leave behind salts and/or proteins on the surface of the skin which can cause white traces on clothing. Such discomforts are to be taken into account including in the case of moderate perspiration.

In the cosmetics field, it is as such well known to use a topical application, antiperspirant products containing substances that have for effect to limit and even suppress the sweat flow so as to remedy the problems mentioned hereinabove. These products are in general available in the form of roll-on, sticks, aerosol or spray.

The antiperspirant substances are in general comprised of aluminum and/or zirconium hydrochlorides. These substances make it possible to reduce the sweat flow by forming a plug on the sweat channel.

However, the use of these substances at high concentrations in order to obtain good effectiveness causes difficulties in terms of the formulation.

In addition, it has been observed that the antiperspirant effectiveness of these substances is limited when they are used alone. This implies that these substances need to be applied several times on the skin in order to obtain a satisfactory effective antiperspirant effect.

Finally, these antiperspirant substances can also leave traces when they are applied which has the consequence of staining clothing.

In order to overcome all of these disadvantages mentioned hereinabove, it has been proposed to seek other effective active substances, that are tolerated by the skin and easy to formulate.

It has already been proposed in application US20070196303 to use cations of the calcium type and/or strontium type in the presence of a buffer comprised of an amino acid and of a betaine in order to reinforce the activity of the aluminum hydrochlorides.

It has also already been proposed in application WO0010512 to use cations of the calcium type in the presence of an acid solution with an amino acid and/or hydroxy acid base in order to reinforce the activity of aluminum and/or zirconium salts. The presence of aluminum and/or zirconium salts remains mandatory in these antiperspirant formulations.

As an alternative to the aluminum and/or zirconium hydrochlorides, it has already been proposed in patent WO2013/013902 an antiperspirant multi-component agent comprising a first component comprised of a cosmetic composition A and a second component comprised of a cosmetic composition B different from the cosmetic composition A, intended to be mixed before application on the skin or to be applied on the skin simultaneously, separately or delayed over time, said cosmetic composition A comprising a multivalent cation halide, and said composition B comprising a non-nitrogen-containing salt of an anion. The application mode is however rather restrictive for the consumer.

As such there is therefore a real need to implement on the skin an agent intended for the treatment of human perspiration that does not have all of the disadvantages described hereinabove, i.e. that provides a satisfactory antiperspirant effect, in particular in terms of effectiveness and resistance to sweat, and that is tolerated well by the skin. Furthermore, there is a need for such an agent intended for the treatment of human perspiration, that can be used alone or in association with an additional antiperspirant agent. Finally, such an agent must be able to be formulated in a way that is stable in storage.

The Applicant discovered surprisingly that this objective could be achieved by having recourse to a cosmetic method for the treatment of human perspiration and optionally body odors resulting from the perspiration, that includes the use of at least one cation $X^{n+}$ of valency n, of at least one anion $Y^{m-}$ of valency m and of at least one modulating agent.

This invention therefore relates to a cosmetic method for the treatment of human perspiration and optionally body odors resulting from the perspiration, that includes the use of at least one cation $X^{n+}$ of valency n, of at least one anion $Y^{m-}$ of valency m and of at least one modulating agent.

When the cation $X^{n+}$ of valency n, the anion $Y^{m-}$ of valency m and the modulating agent are formulated in an anhydrous medium, they can be present within the same composition (i.e. a single composition).

Alternatively, they can be formulated in two different compositions, one comprising the cation $X^{n+}$ of valency n (composition A), and the other comprising the anion $Y^{m-}$ of valency m (composition B). The modulating agent can however be present in the composition A and/or in the composition B. According to an alternative, the modulating agent is not introduced into the composition A or into the composition B, but it is generated during the mixture between the compositions A and B.

When the cation $X^{n+}$ of valency n, the anion $Y^{m-}$ of valency m and the modulating agent are formulated in an aqueous medium (i.e. comprising an aqueous phase, for example an aqueous solution or an oil-in-water or water-in-oil emulsion), the cation is necessarily formulated in a composition separate from the anion.

As such in this embodiment, preferably:
the cation $X^{n+}$ of valency n is present in a composition A;
the anion $Y^{m-}$ of valency m is present in a composition B, the compositions A and B being different, and the composition A and/or B comprising at least an aqueous phase; and
the modulating agent is present in the composition A and/or in the composition B. According to an alternative, the modulating agent is not introduced into the composition A or into the composition B, but it is generated during the mixture between the compositions A and B.

Preferably, this invention relates to a cosmetic method for the treatment of human perspiration and optionally body odors resulting from the perspiration, that includes
(i) either the mixing just before use of at least one composition A and of at least one composition B, said compositions A and B being packaged separately, followed by the application of the resulting mixture on the surface of the skin;
(ii) or the application on the surface of the skin simultaneously or sequentially of at least one composition A and of at least one composition B packaged separately;
(iii) or the application on the surface of the skin of a composition comprising in the same support at least one composition A and of at least one composition B;
said composition A comprising in a cosmetically acceptable medium at least one cation $X^{n+}$ of valency n;
said composition B comprising in a cosmetically acceptable medium at least one anion $Y^{m-}$ of valency m;
the mixture of said composition A with said composition B comprising in addition at least one modulating agent.

According to a first embodiment, the modulating agent can be present in the composition A and/or in the composition B.

According to a second embodiment, it can also not be present in the composition A or in the composition B, but be generated in situ following the mixture of said compositions A and B.

Such a method according to the invention is effective in the treatment of human perspiration. Furthermore, the compositions A and B are stable in storage.

This invention also relates to a cosmetic composition, in particular for the treatment of human perspiration and optionally body odors resulting from the perspiration, ready-to-use, that includes, in a cosmetically acceptable medium, at least one cation $X^{n+}$ of valency n, of at least one anion $Y^{m-}$ of valency m and of at least one modulating agent. This composition is called "ready-to-use composition" in this application.

The term "ready to use" means that the composition is applied on the surface of the skin in a very short period of time following the preparation thereof, for example from a few seconds to a few minutes following the preparation thereof. Typically, the time between the mixing of the cation(s) $X^{n+}$ of valency n, anion(s) $Y^{m-}$ of valency m and modulator(s) and the application on the skin is from 0 to 30 minutes, preferably from 0 to 10 minutes, preferably from 0 to 1 minute, and preferably from 0 to 30 seconds.

The term "antiperspirant agent" means any substance or any composition that has for effect to reduce sweat flow and/or reducing the damp sensation on the skin associated with human sweat and/or to mask human sweat.

The term "cosmetically acceptable medium" means a medium compatible with the skin and/or integuments or mucosa thereof, having a pleasant color, odor and texture and not giving rise to unacceptable discomfort (such as tightness), liable to dissuade the consumer from using the composition.

Said cosmetically acceptable medium is also a medium that does not leave any traces during the application thereof, and that does not as such stain clothing.

Said cosmetically acceptable medium can be anhydrous or include an aqueous phase. Preferably, it comprises an aqueous phase. Preferably in particular, the cosmetically acceptable medium of the ready-to-use composition comprises an aqueous phase.

The term "cation $X^{n+}$" means an ionic compound preferably inorganic comprising one or several positive charges; the valency n indicating the number of positive charges.

The term "anion $Y^{m-}$" means an ionic compound preferably inorganic comprising one or several negative charges; the valency m indicating the number of negative charges.

The term "sequential" means a successive administration.

The term "same support" means that the compositions A and B according to the invention are present in the same packaging, in particular in a two-compartment packaging that allows for the simultaneous applications of the compositions A and B.

Cation $X^{n+}$

The cations $X^{n+}$ in accordance with the invention are chosen preferably from the multivalent inorganic cations of which the valency n is by definition at least 2, preferably 2, 3 or 4.

The multivalent inorganic cations $X^{n+}$ are preferably chosen from:
the alkali earth cations such as Magnesium ($Mg^{2+}$) or Calcium ($Ca^{2+}$); and
the transition metal cations such as Titanium ($Ti^{4+}$), Manganese ($Mn^{2+}$, $Mn^{3+}$, $Mn^{4+}$), Iron ($Fe^{2+}$, $Fe^{3+}$), copper ($Cu^{2+}$), Zinc ($Zn^{2+}$) or Zirconium ($Zr^{4+}$).

The multivalent inorganic cations $X^{n+}$ are preferably chosen from the alkali earth cations.

The preferred alkali earth cations will be chosen from Magnesium ($Mg^{2+}$) and Calcium ($Ca^{2+}$).

The preferred transition metal cations will be chosen from Zinc, Manganese, Iron and Titanium.

The cations in accordance with the invention are introduced into the single anhydrous composition, into the composition A or into the ready-to-use composition, in the form of water soluble salts. In terms of this invention, the term "water soluble salt" means any salt that, after having been completely dissolved with stirring at 0.5% in a solution of water at a temperature of 25° C., leads to a solution comprising a quantity of insoluble salt less than 0.05% by weight.

Preferably, the water soluble salts of cation $X^{n+}$ are chosen from halides, sulfates and carboxylates.

Indeed, among the salts of cation $X^{n+}$ that can be used according to the invention, mention can be made of halides. As halides, fluorides (Fluorine), chlorides (Chlorine), bromides (Bromine) and iodides (Iodine) and more particularly chlorides will be used.

Among the water soluble salts of cations $X^{n+}$ that can be used according to the invention, mention can also be made of carboxylic acid salts or carboxylates such 35 as acetates, propionates, pyrrolidone carboxylates (or pidolates); polyhydroxyl carboxylic acid salts such as gluconates, heptagluconates, keto-glutonates; mono or polycarboxylic hydroxy acid salts such as citrates, lactates; amino acid salts such as aspartates, glutamates and ascorbic acid salts. Acetate salts, lactate salts or aspartate salts will be used more particularly.

Mention can also be made of sulfates such as magnesium sulfate, ferric sulfates, zinc sulfates.

As examples of salts of cation $X^{n+}$ in accordance with the invention, mention can be made of Magnesium chloride, Calcium chloride, Calcium pidolate, Calcium aspartate, Calcium gluconate, Calcium glutamate, Calcium heptagluconate, Calcium propionate, Calcium 2-cetogluconate, Calcium lactate, Calcium ascorbate, Calcium citrate, Magnesium acetate, Magnesium pidolate, Magnesium gluconate, Magnesium glutamate, Magnesium heptagluconate, Magnesium 2-cetogluconate, Magnesium lactate, Magnesium ascorbate, Magnesium citrate, Magnesium aspartate or Manganese gluconate.

Mention can also be made of sulfates such as Magnesium sulfate.

Calcium chloride, Magnesium chloride, Calcium acetate, Magnesium lactate, Calcium citrate and Magnesium citrate will preferably be chosen.

Preferably, the composition A comprising at least one cation $X^{n+}$ according to the invention comprises an aqueous phase and has a pH between 2 and 6, preferably between 3 and 5. If necessary, the pH is adjusted with a cosmetically acceptable organic or mineral acid or base. Such an acid or such a base are those conventionally used in cosmetics.

The composition A comprises at least one cation $X^{n+}$ of valency n, and does not contain any anion(s) $Y^{m-}$ of valency m as counter ion(s).

Preferably, the composition A comprises at least one cation $X^{n+}$ of valency n in a content between 0.5% and 30% by weight of the total weight of the composition A, preferably between 1% and 25% by weight.

Likewise, preferably, the single anhydrous composition comprises at least one cation $X^{n+}$ of valency n in a content between 0.5% and 30% by weight of the total weight of the composition, preferably between 1% and 25% by weight.

According to a particular embodiment of the invention, the composition A comprises a mixture of cations $X^{n+}$ of valency n, and does not contain any anion(s) $Y^{m-}$ of valency m.

According to a preferred embodiment of the invention, the composition A comprises a cation $X^{n+}$ of valency n, and does not contain any anion(s) $Y^{m-}$ of valency m.

According to another embodiment of the invention, the "ready-to-use composition" comprises a cation $X^{n+}$ of valency n, and one or several anion(s) $Y^{m-}$ of valency m, preferably one anion $Y^{m-}$ of valency m.

Anion $Y^{m-}$

The anions $Y^{m-}$ in accordance with the invention preferably have a valency m of at least 2, preferably 2, 3 or 4. They are preferably inorganic. They are chosen preferably from carbonate ($CO_3^{2-}$), hydrogenocarbonate ($HCO_3^-$) phosphate ($PO_4^{3-}$), polyphosphates such as diphosphate $P_2O_7^{4-}$ (also called pyrophosphate), triphosphate $P_3O_{10}^{5-}$, phosphonate ($PO_3^{3-}$), hydrogenophosphate ($HPO_4^{2-}$), sulfate ($SO_4^{2-}$), sulfonate ($SO_3^{2-}$), hydrogenosulfate ($HSO_4^-$), hydrogenosulfonate ($HSO_3^-$), silicate ($SiO_3^{2-}$). Hydrogenophosphate or hydrogenocarbonate will be used more particularly.

The anions $Y^{m-}$ in accordance with the invention are introduced into the single anhydrous composition, into the composition B or into the ready-to-use composition, in the form of a water soluble salt. In terms of this invention, the term "water soluble salt" of an anion $Y^{m-}$ means any salt that, after having been completely dissolved with stirring at 0.5% in a solution of water at a temperature of 25° C., leads to a solution comprising a quantity of insoluble salt less than 0.05% by weight.

The water soluble salt of anion $Y^{m-}$ can be chosen for example from:
alkali metal salts such as potassium, sodium, and
ammonium salts, such as alkanolamine salts (in particular mono-, di- or tri-alkanolamine), comprising one to three $C_1$-$C_4$ hydroxyalkyl radicals, identical or not.

Among the alkanolamine compounds, mention can be made of monoethanolamine, diethanolamine, triethanolamine, monoisopropanolamine, diisopropanolamine, N-dimethylaminoethanolamine, 2-amino-2-methyl-1-propanol, triisopropanolamine, 2-amino-2-methyl-1,3-propanediol, 3-amino-1,2-propanediol, 3-dimethylamino-1,2-propanediol, tris-hydroxymethylaminomethane.

Preferably, the anion $Y^{m-}$ will be introduced in the form of an alkali metal salt, in particular a sodium or potassium salt.

Among the preferred salts of anion $Y^{m-}$, mention can be made of $Na_2CO_3$, $K_2CO_3$, $NaHCO_3$, $KHCO_3$, $Na_3PO_3$, $Na_2HPO_4$, $NaH_2PO_4$, $Na_2H_2P_2O_7$, $Na_4P_2O_7$, $K_2HPO_4$, $KH_2PO_4$, $K_2H_2P_2O_7$, $K_4P_2O_7$, $Na_2SO_4$, $K_2SO_4$. Hydrogenocarbonate of sodium $NaHCO_3$, or hydrogenophosphate disodium $Na_2HPO_4$ will preferably be used.

The molar ratio between the cation or cations $X^{n+}$ and the anion or anion $Y^{m-}$ varies preferably from 10:1 to 1:10 and more preferably from 4:1 to 1:4.

The total concentration in cation(s) $X^{n+}$ and in anion(s) $Y^{m-}$ varies preferably from 1 to 70% by weight and more preferably from 2 to 50% by weight of the total weight of the compositions A and B (or in the ready-to-use composition or in the single anhydrous composition).

The composition B comprises at least one anion $Y^{m-}$ of valency m, and does not contain any cation $X^{n+}$ of valency n as counter ion.

Preferably, the composition B comprises at least one anion $Y^{m-}$ of valency m in a content between 0.5% and 30% by weight of the total weight of the composition B, preferably between 0.7% and 25% by weight.

Likewise, preferably, the single anhydrous composition comprises at least one anion $Y^{m-}$ of valency m in a content between 0.5% and 30% by weight of the total weight of the composition B, preferably between 0.7% and 25% by weight.

According to a particular embodiment of the invention, the composition B comprises a mixture of anions $Y^{m-}$ of valency m, and does not contain any cation(s) $X^{n+}$ of valency n.

According to a preferred embodiment of the invention, the composition B comprises anions $Y^{m-}$ of valency m, and does not contain any cation(s) $X^{n+}$ of valency n.

According to another embodiment of the invention, the "ready-to-use composition" comprises an anion $Y^{m-}$ of valency m, and one or several cation(s) $X^{n+}$ of valency n, preferably one cation(s) $X^{n+}$ of valency n.

Modulators

As indicated hereinabove, according to a first embodiment, the modulating agent(s) can be present in the composition A and/or in the composition B. Preferably, the modulating agent(s) are present in the composition A.

According to a second embodiment, it can also not be present in the composition A or in the composition B, but be generated in situ following the mixture of said compositions A and B.

The modulating agent in accordance with the invention can be chosen from the complexing agents of the cation(s) $X^{n+}$ and the complexing agents of the anion(s) $Y^{m-}$. Preferably, the modulating agent in accordance with the invention can be chosen from the complexing agents of the cation(s) $X^{n+}$.

The modulating agent in accordance with the invention is different from the anion(s) $Y^{m-}$ and from the cation(s) $X^{n+}$.

In particular, it can be chosen from:
- the mono or polycarboxylic acids (preferably di- or tricarboxylic), optionally hydroxylated (i.e. hydroxyacids), in free or salified form, such as propionic acid, citric acid, tartaric acid, lactic acid, malic acid, succinic acid, glutaric acid, itaconic acid,
- the amino carboxylic acids in free or salified form such as aspartic acid, glutamic acid, serine, alanine, dehydroalanine and the oligomers thereof, iminosuccinic acid and the derivatives thereof, ethylene diamine tetraacetic acid,
- monosaccharides, oligosaccharides, polysaccharides and the derivatives thereof.

Preferably, the monosaccharides are chosen from glucose, galactose, mannose, xylose, lyxose, fucose, arabinose, rhamnose, ribose, deoxyribose, quinovose, fructose, sorbose, talose, threose and erythrose. Preferably, the oligosaccharides comprise from 2 to 6 monosaccharide units, and are preferably chosen from trehalose, lactose, maltose and cellobiose. The derivatives are preferably chosen from glucuronic and lactobionic acid. Finally, the polysaccharides are preferably chosen from alginates, chitosans and pectins,
- ascorbic acid,
- phytic acid,
- polymers or copolymers of carboxylic acids in free or salified form such as the products sold under the name SOKOLAN CP42, CP44 by BASF,
- polymers or copolymers of amino carboxylic acids in free or salified form such as polyaspartic acid such as for example the polymers mentioned in patents WO 9216462, WO 9403527 Srchem Incorp. and in particular a solution sodium polyaspartate at 30% in water such as the product sold under the trade name AQUADEW SPA-30 by Ajinomoto; polyglutamic acid,
- polymers or copolymers of maleic or itaconic acid,
- polymers or copolymers of carboxymethylinulin.

Among the preferred modulators, when they must be added, mention will be made of amino carboxylic acids in free or salified form, mono or polycarboxylic acids optionally hydroxylated in free or salified form, ascorbic acid, polymers or copolymers of amino carboxylic acids in free or salified form such as polyaspartic acid, or the polymers or copolymers of carboxylic acids in free or salified form.

Citric acid, ascorbic acid, lactic acid, propionic acid, tartaric acid or polyaspartic acid, in free or salified form, or a polymers or copolymers of carboxylic acids optionally amino will be used more particularly.

According to a particular embodiment of the invention, the composition A or the composition B or the "ready-to-use composition" or the single anhydrous composition, comprise a mixture of modulating agents, preferably two modulating agents.

More preferably, as modulating agents will be used a mixture of citric acid in free form and of citric acid in salified form (or citrate), in particular a mixture of citric acid and of sodium citrate. More preferably, the weight ratio (citric acid in free form):(citric acid in salified form) is between 1:4 and 1:2.

The modulating agent(s) in accordance with the invention can be present in the composition A and/or B (or in the ready-to-use composition or in the single anhydrous composition) in a content between 0.01 and 30% by weight of the total weight of the composition A and/or B (or of the ready-to-use composition or of the single anhydrous composition), preferably between 0.03 and 10% by weight.

Preferably, the weight ratio between the modulating agent(s) and the salt(s) of cation(s) $X^{n+}$ is between 0.01 and 1.5, preferably between 0.03 and 1.

Preferably, the composition resulting from the mixture of the compositions A and B (or the ready-to-use composition) has a pH between 5 and 8.

Method of Application

In order to obtain an antiperspirant effect on the skin, according to a first alternative of the method for the treatment of perspiration of the invention (embodiment (i)), the composition A comprising at least one cation $X^{n+}$ and the composition B comprising at least one anion $Y^{m-}$ will be packaged separately and are mixed just before use (extemporaneous mixture) then the mixture obtained as such is applied on the surface of the skin to be treated.

According to a second alternative of the antiperspirant method of the invention (embodiment (ii)), the composition A comprising at least one cation $X^{n+}$ and the composition B comprising at least one anion $Y^{m-}$ will be packaged separately and applied simultaneously or sequentially on the surface of the skin to be treated.

According to this alternative, when the compositions A and B are applied sequentially, the interval of time separating the application of the composition A from the application B can vary from 1 second to 24 hours, more preferably from 10 seconds to 24 hours and even more preferably from 1 minute to 1 hour.

In order to obtain an antiperspirant effect on the skin, according to a third alternative of the method for the treatment of perspiration of the invention (embodiment (iii)), on the surface of the skin is directly applied a composition comprising in the same support the composition A containing at least one cation $X^{n+}$, the composition B containing at least one anion $Y^{m-}$ and at least one modulator.

The compositions A and B can, each one independently, be anhydrous or comprise an aqueous phase. They will preferably be in the form of aqueous solutions, alcoholic or hydroalcoholic solutions.

With regards in particular to the aforementioned embodiment (iii), the compositions A and B can be for example packaged in a device comprising at least two compartments containing respectively the composition A and the composition B such as a twin-tubes, a pump bottle with two compartments, an aerosol device comprising two compartments that can include one or more outlet orifices (mononozzle or double-nozzle), a device provided with a perforated wall such as a grid comprising two compartments; a device comprising two compartments each provided with a ball applicator (multi-ball roll-on); a double-stick.

Preferably, the compositions A and B will be applied sequentially and even more preferably, the composition A comprising at least one cation $X^{n+}$ will be applied first.

Preferably, the compositions A and B will be applied sequentially and even more preferably, the composition A comprising at least one cation $X^{n+}$ and at least one modulating agent will be applied first.

Dosage Forms

The compositions A and/or B (or the ready-to-use composition or the single anhydrous composition) can independently of one another be presented in any of the dosage forms conventionally used for topical application and particularly in the form of aqueous gels, aqueous or hydroalcoholic solutions. The compositions A and/or B (or the ready-to-use composition) can also be anhydrous. They may also, by the addition of a fatty or oil phase, be in the form of dispersions such as lotion, emulsions of liquid or semi-liquid consistency such as milk, obtained by dispersing a fatty phase in an aqueous phase (O/W) or conversely (W/O), or suspensions or emulsions of soft, semi-solid or solid consistency such as cream or gel, or multiple emulsions (W/O/W or O/W/O), microemulsions, ionic and/or non-ionic type vesicle dispersions, or wax/aqueous phase dispersions. These compositions A and/or B (or the ready-to-use composition or the single anhydrous composition) are prepared according to the usual methods.

The compositions A and/or B may be particularly packaged in pressurized form in an aerosol device or in a pump bottle; packaged in a device equipped with a perforated wall particularly a grid; packaged in a device equipped with a roll-on applicator; packaged in stick form, in loose or compact powder form. In this respect, they contain the ingredients generally used in this type of products and well-known to those skilled in the art.

According to another particular embodiment of the invention, the compositions A and/or B or the ready-to-use composition or the single anhydrous composition, can be solid in particular in the form of a stick; in loose or compact powder form.

The term "solid composition" denotes that the measurement of the maximum force measured by means of texturometric analysis on inserting a probe in the sample of formula should be at least equal to 0.25 Newton, in particular at least equal to 0.30 Newton, particularly at least equal to 0.35 Newton, assessed under precise measurement conditions as follows.

To take texturometric measurements, the formulas are poured when heated into jars 4 cm in diameter and 3 cm at the bottom. Cooling is performed at ambient temperature. The hardness of the formulas produced is measured after waiting 24 hours. The jars containing the samples are characterized by means of texturometric analysis using a texturometer such as that marketed by Rheo TA-XT2, according to the following protocol: a 5 mm diameter stainless steel ball type probe is brought into contact with the sample at a speed of 1 mm/s. The measurement system detects the interface with the sample with a detection threshold equal to 0.005 Newtons. The probe is inserted 0.3 mm into the sample, at a rate of 0.1 mm/s. The measurement apparatus records the progression of the compression force measured over time, during the penetration phase. The hardness of the sample corresponds to the mean of the maximum values of the force detected during penetration, for at least 3 measurements.

The invention also relates to a method for the cosmetic treatment of human perspiration, and optionally body odors associated with human perspiration, consisting in applying on the surface of the skin, in particular on the surface of the underarms, an effective quantity of the composition A and an effective quantity of the composition B; or an effective quantity of the ready-to-use composition; or an effective quantity of the single anhydrous composition.

The application time of the composition A and/or B (or of the ready-to-use composition or of the single anhydrous composition) on the surface of the skin can vary from 0.5 to 10 seconds, preferably from 1 to 5 seconds.

These compositions A and B (or the ready-to-use composition or the single anhydrous composition) can be applied several times on the surface of the skin. They can be applied several times, over one day or over several days.

Another object of this invention is an aerosol device constituted by a first receptacle comprising a pressurized composition A, a second receptacle comprising a pressurized composition B and by a dispensing means of the mixture of said composition.

The dispensing means, forming part of the aerosol device, generally consist of a dispensing valve controlled by a dispensing head, in turn comprising a nozzle via which the pressurized compositions A and B are sprayed as a mixture. The receptacle containing the pressurized compositions A and B may be opaque or transparent. It may be made of glass, polymeric or metal material, optionally coated with a layer of protective varnish.

Another object of this invention is an aerosol device comprised of a receptacle comprising a pressurized anhydrous composition comprising, in a cosmetically acceptable medium, at least one cation $X^{n+}$ of valency n, at least one anion $Y^{m-}$ of valency m and at least one modulating agent; and by a dispensing means of the mixture of said composition.

The dispensing means, forming part of the aerosol device, generally consist of a dispensing valve controlled by a dispensing head, in turn comprising a nozzle via which the pressurized anhydrous composition is sprayed. The receptacle containing the pressurized anhydrous composition may be opaque or transparent. It may be made of glass, polymeric or metal material, optionally coated with a layer of protective varnish.

The compositions A and/or B (or the ready-to-use composition or the single anhydrous composition) can also comprise at least one deodorant agent and/or at least one additional antiperspirant agent.

The term "deodorant agent" denotes in the context of the present invention any agent, alone, with the effect of masking, absorbing, enhancing and/or reducing the unpleasant odor resulting from the decomposition of human sweat.

By way of illustration of these additional deodorant agents can in particular be mentioned bacteriostatic agents or bactericidal agents acting on germs of underarm odor, such as 2,4,4'-trichloro-2'-hydroxydiphenylether (®Triclosan), 2,4-dichloro-2'-hydroxydiphenylether, 3',4',5'-trichlorosalicylanilide, 1-(3',4'-dichlorophenyl)-3-(4'-chlorophenyl) urea (®Triclocarban) or 3,7,11-trimethyldodeca-2,5,10-trienol (®Farnesol); quaternary salts ammonium such as cetyltrimethylammonium salts, cetylpyridinium salts; polyols such as those of the glycerin type, 1,3-propanediol (ZEMEA PROPANEDIOL® sold by Dupont Tate and Lyle Bioproducts), 1,2-decanediol (Symclariol® from Symrise); glycerin derivatives such as for example Caprylic/Capric Glycerides (CAPMUL MCM® from Abitec), Caprylate or glyceryl caprylate (DERMOSOFT GMCY® and DERMOSOFT GMC® respectively from STRAETMANS), Polyglyceryl-2 Caprate (DERMOSOFT DGMC® from STRAETMANS), biguanide derivatives such as polyhexamethylene biguanide salts; chlorhexidine and salts thereof; 4-Phenyl-4,4-dimethyl-2butanol (SYMDEO MPP® from Symrise); cyclodextrins; or alun.

The additional deodorant agents can be present preferably in the compositions according to the invention in mass concentrations ranging from 0.01% to 10% by weight in relation to the total weight of the composition.

The term "antiperspirant agent" denotes any substance, alone, with the effect of reducing sweat flow, reducing the damp sensation on the skin associated with human sweat, masking human sweat.

By way of illustration of these additional antiperspirant agents, mention can be made in particular of aluminum and/or zirconium antiperspirant salts or complexes, preferably chosen from aluminum halohydrates; aluminum and zirconium halohydrates, zirconium hydroxychloride and aluminum hydroxychloride complexes with or without an amino acid such as those described in patent U.S. Pat. No. 3,792,068.

Among the aluminum salts mention can be made in particular of aluminum chlorhydrate in activated or non-activated form, aluminum chlorohydrex, aluminum chlorohydrex polyethyleneglycol complex, aluminum chlorohydrex propyleneglycol complex, aluminum dichlorohydrate, aluminum dichlorohydrex polyethyleneglycol complex, aluminum dichlorohydrex propyleneglycol complex, aluminum sesquichlorohydrate, aluminum sesquichlorohydrex polyethylene glycol complex, aluminum sesquichlorohydrex propyleneglycol complex, aluminum sulfate buffered by aluminum and sodium lactate.

Among the aluminum and zirconium salts mention can be made in particular of aluminum zirconium octachlorohydrate, aluminum zirconium pentachlorohydrate, aluminum zirconium tetrachlorohydrate, aluminum zirconium trichlorohydrate.

Zirconium hydroxychloride and aluminum hydroxychloride complexes with an amino acid are generally known under the name ZAG (when the amino acid is glycine). Among these products, mention can be made of the complexes of aluminum zirconium octachlorohydrex glycine, aluminum zirconium pentachlorohydrex glycine, aluminum zirconium tetrachlorohydrex glycine and aluminum zirconium trichlorohydrex glycine.

Aluminum sesquichlorohydrate is in particular sold under the trade name REACH 301® by SUMMITREHEIS.

Among the aluminum and zirconium salts, mention can be made of the complexes of zirconium hydroxychloride and aluminum hydroxychloride with an amino acid such as glycine having for name INCI: ALUMINUM ZIRCONIUM TETRACHLOROHYDREX GLY for example that sold under the trade name REACH AZP-908-SUF® by SUMMITREHEIS.

Use will be made more particularly of aluminum chlorhydrate in activated or non-activated form sold under the trade names LOCRON S FLAR, LOCRON P, LOCRON L.ZA by CLARIANT; under the trade names MICRODRY ALUMINUM CHLOROHYDRATER, MICRO-DRY 323®, CHLORHYDROL 50, REACH 103, REACH 501 by SUMMITREHEIS; under the trade name WESTCHLOR 200® by WESTWOOD; under the trade name ALOXICOLL PF 40® by GUILINI CHEMIE; CLURON 50%® by INDUSTRIA QUIMICA DEL CENTRO; CLOROHIDROXIDO ALUMINIO SO A 50%® by FINQUIMICA.

As another antiperspirant agent, mention can be made of the particles of expanded perlite such as those obtained by the method of expansion described in the patent U.S. Pat. No. 5,002,698.

Preferably, the compositions A and/or B (or the ready-to-use composition or the single anhydrous composition) comprise less than 5% by weight of aluminum salt, preferable less than 3% by weight, preferably less than 1% by weight.

Preferably, the compositions A and/or B (or the ready-to-use composition or the single anhydrous composition) are totally free of aluminum salt.

In the case where the compositions A and B are mixed extemporaneously, the dosage forms will preferably be aqueous, alcoholic or hydroalcoholic solutions.

Aqueous Phase

The compositions A and/or B (or the ready-to-use composition) can comprise at least one aqueous phase. They are formulated particularly in aqueous lotions or in a water-in-oil emulsion, an oil-in-water emulsion, or in a multiple emulsion (triple oil-in-water-in-oil or water-in-oil-in-water emulsion) (such emulsions are known and described for example by C. FOX in "Cosmetics and Toiletries"—November 1986—Vol 101—pages 101-112).

The aqueous phase of said compositions A and/or B (or the ready-to-use composition) contains water and generally other solvents soluble in water or miscible with water. The water-soluble or miscible solvents comprise short-chain mono-alcohols for example $C_1$-$C_4$ such as ethanol, isopropanol; diols or polyols such as ethyleneglycol, 1,2-propyleneglycol, 1,3-butylene glycol, hexyleneglycol, diethyleneglycol, dipropylene glycol, 2-ethoxyethanol, diethylene glycol monomethylether, triethylene glycol monomethylether and sorbitol. Propyleneglycol and glycerin, propane 1,3 diol shall more particularly be used.

Emulsifiers a) Oil-In-Water Emulsifiers

The compositions A and/or B (or the ready-to-use composition) can comprise at least one surfactant.

The surfactants can be of any sort usually used in cosmetics, such as anionic surfactants, cationic surfactants, amphoteric surfactants or non-ionic surfactants.

Preferably, non-ionic surfactants are used such as:

C8-C30 (preferably C12-C18) polyoxyethylenated fatty alcohols, having in particular from 2 to 100 moles of ethylene oxide, such as oxyethylene ether of cetearylic alcohol with 30 oxyethylene groups (CTFA name "Ceteareth-30"), oxyethylene ether of stearylic alcohol with 20 oxyethylene groups (CTFA name "Steareth-20") such as BRIJ 78 marketed by UNIQEMA, or oxyethylene ether of cetearylic alcohol with 33 oxyethylene groups (CTFA name "Ceteareth-33");

C8-C30 fatty alcohol and sugar, in particular alkyl (C8-C30) (poly) glucosides, alone or in mixtures with alcohols, such as the mixture of cetylstearyl alcohol and of cocoglucoside sold under the name MONTANOV 82® by Seppic, the mixture of arachidylic alcohol and of vehenyl alcohol with arachidylglucoside sold under the name MONTANOV 802® by Seppic, the mixture of myristyl alcohol and of myristylglucoside sold under the name MONTANOV 14® by Seppic, the mixture of cetylstearalic alcohol and of cetylstearylglucoside sold under the name MONTANOV 68® by Seppic, the mixture of C14-C22 alcohol with C12-C20 alkylglucoside sold under the name MONTANOV L® by Seppic, the mixture of cocoalcohol and cocoglucoside sold under the name MONTANOV S® by Seppic or the mixture of isostearyl alcohol and isostearylglucoside sold under the name MONTANOV WO 18® by Seppic;

ethers of polyethylene glycol, having in particular from 20 to 120 ethylene oxide motifs, and of C8-C30 fatty acid esters and of glucose or of methylglucose, C8-C30 fatty acid esters and sorbitan, C8-C30 fatty acid esters and polyoxyethylenated sorbitan, having in particular from 2 to 30 moles of ethylene oxide, C8-C30 polyoxyethylenated fatty acid esters and sorbitan, having in particular from 2 to 100 moles of ethylene oxide, C8-C30 fatty acid mono or di esters and glycerol, C8-C30 polyglycerolated fatty acid esters, having in particular from 2 to 16 moles of glycerol, C8-C30 fatty acid esters and polyethylene glycol, having in particular from 2 to 200 moles of ethylene oxide, C8-C30 fatty acid esters and of glucose or of alkyl(C1-C2)glucose or sucrose, and mixtures thereof.

The surfactant(s) can be present in a quantity ranging from 0.1 to 10% by weight, with respect to the total weight of the composition A or B (or of the ready-to-use composition), preferably ranging from 0.2 to 5% by weight, and preferably ranging from 1% to 4% by weight.

b) Water-In-Oil Emulsifiers

Among the emulsifiers that can be used in the water-in-oil emulsions or triple water-in-oil-in-water-in-oil emulsions or triple emulsions, mention can be made as an example of alkyl dimethicone copolyols having the following formula (I)

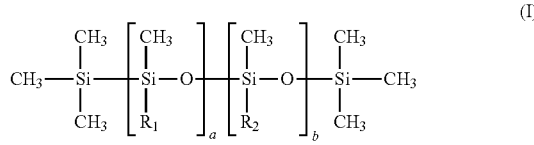

wherein:

$R_1$ designates a $C_{12}$ to $C_{20}$ linear or branched alkyl group and preferably $C_{12}$ to $C_{18}$;

$R_2$ designates the group: $—C_nH_{2n}—(—OC_2H_4—)_x—(—OCH_6—)_y—O—R_3$, $R_3$ represents a hydrogen atom or a linear or branched alkyl radical having from 1 to 12 carbon atoms;

a is an integer varying from 1 to about 500;

b designates an integer varying from 1 to about 500;

n is an integer varying from 2 to 12 and preferably from 2 to 5;

x designates an integer varying from 1 to about 50 and preferably from 1 to 30;

y designates an integer varying from 0 to about 49 and preferably 0 to 29 with the reserve that when y is different from zero the ratio x/y is greater than 1 and preferably varies from 2 to 11.

Among the preferred copolyol alkyldimethicone emulsifiers having formula (I), mention will be made particularly of CETYL PEG/PPG-10/1 DIMETHICONE and more particularly the mixture CETYL PEG/PPG-10/1 DIMETICONE AND DIMETHICONE (INCI name) such as the product sold under the trade name ABIL EM90 by GOLDSCHMIDT, LAURYL PEG/PPG-18/18 methicone and more particularly the mixture LAURYL PEG/PPG-18/18 methicone and DODECENE and POLOXAMER 407 such as the product sold under the trade name DOW CORNING 5200 FORMULATION AID by DOW CORNING or the mixture (Polyglyceryl-4-stearate and Cetyl PEG/PPG-10 (and) Dimethicone (and) Hexyl Laurate) such as the product sold under the trade name ABIL WE09 by GOLDSCHMIDT.

Among the water-in-oil emulsifiers, mentioned can also be made of copolyol dimethicones having the following formula (II)

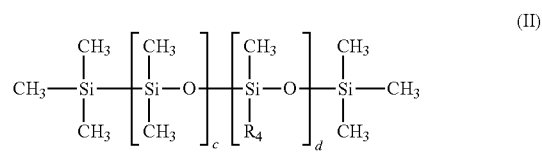

in which $R_4$ designates the group: $—C_mH_{2m}—(—OC_2H_4—)_s—(—OCH_6—)_t—O—R_5$, $R_5$ designates a hydrogen atom or a linear or branched alkyl radical having from 1 to 12 carbon atoms;

c is an integer varying from 1 to about 500 d designates an integer varying from 1 to about 500, n is an integer varying from 2 to 12 and preferably from 2 to 5, s designates an integer varying from 1 to about 50, and preferably from 1 to 30;

t designates an integer varying from 0 to about 50 and preferably from 0 to 30;

provided that the sum s+t is greater than or equal to 1.

Among these preferred copolyol dimethicone emulsifiers having formula (II) use will be made in particular of PEG-18/PPG-18 DIMETHICONE and more particularly the mixture CYCLOPENTASILOXANE (and) PEG-18/PPG-18 DIMETHICONE (INCI name) such as the product sold by Dow Corning under the trade name Silicone DC 5225 C or KF-6040 by Shin Etsu.

According to a particularly preferred embodiment, a mixture of at least one emulsifier having formula (I) and of at least one emulsifier having formula (II) will be used.

Use will more particularly be made of a mixture of PEG-18/PPG-18 Dimethicone and Cetyl PEG/PPG-10/1 DIMETHICONE, LAURYL PEG/PPG-18/18 methicone and even more particularly a mixture of (CYCLOPENTASILOXANE (and) PEG-18/PPG-18 Dimethicone) and of Cetyl PEG/PPG-10/1 DIMETICONE and Dimethicone or of (Polyglyceryl-4-stearate and Cetyl PEG/PPG-10 (and) Dimethicone (and) Hexyl Laurate) or the mixture LAURYL PEG/PPG-18/18 methicone and DODECENE and POLOXAMER 407.

Among the water-in-oil emulsifiers, mention can also be made of the non-ionic emulsifiers derived from fatty acids and from polyol, alkylpolyglycosides (APG), esters of sugars and the mixtures thereof.

As non-ionic emulsifiers derived from fatty acids and from polyol, it is possible to use in particular fatty acid esters and polyol, the fatty acid in particular having a C8-C24 alkyl chain, and the polyols being for example glycerol and sorbitan.

As fatty acid esters and polyol, mention can be made in particular of isostearic acid esters and polyols, stearic acid esters and polyols, and mixtures thereof, in particular isostearic acid esters and glycerol and/or sorbitan.

The polyol alkyl esters particularly include polyethyleneglycol esters such as PEG-30 Dipolyhydroxystearate such as the product marketed under the name Arlacel P135 by ICI.

The glycerol and/or sorbitan esters include, for example, polyglycerol isostearate, such as the product marketed under the name Isolan GI 34 by Goldschmidt; sorbitan isostearate, such as the product marketed under the name Arlacel 987 by ICI; sorbitan isostearate and glycerol, such as the product marketed under the name Arlacel 986 by ICI, the mixture of sorbitan isostearate and of polyglycerol isostearate (3 moles) marketed under the name Arlacel 1690 by Unigema and mixtures thereof.

The emulsifier can also be chosen from alkylpolyglycosides having an HLB less than 7, for example those represented by the following general formula (1):

R—O-(G)x (1)

wherein R represents a branched and/or unsaturated alkyl radical, comprising from 14 to 24 carbon atoms, G represents a reduced sugar comprising from 5 to 6 carbon atoms, and x designates a value ranging from 1 to 10 and preferably from 1 to 4, and G in particular designates glucose, fructose or galactose.

The unsaturated alkyl radical can comprise one or more ethylene unsaturations, and in particular one or two ethylene unsaturations.

As alkylpolyglycosides of this type, mention can be made of alkylpolyglucosides (G=glucose in the formula (1)), and in particular the compounds having formula (I) wherein R represents more particularly an oleyl radical (C18 unsaturated radical) or isostearyl (C18 saturated radical), G designates glucose, x is a value varying from 1 to 2, in particular isostearyl-glucoside, oleyl-glucoside and mixtures thereof. This alkylpolyglucoside can be used in a mixture with a co-emulsifier, more especially with a fatty alcohol and in particular a fatty alcohol having the same fatty chain as that of alkylpolyglucoside, i.e. comprising from 14 to 24 carbon atoms and having a branched and/or unsaturated chain, and for example isostearylic alcohol when the alkylpolyglucoside is isostearyl-glucoside, and the oleyl alcohol when the alkylpolyglucoside is oleyl-glucoside, optionally in the form of a self-emulsifying composition, such as described for example in document WO-A-92/06778. It is possible to use for example the mixture of isostearyl-glucoside and of isostearylic alcohol, marketed under the name Montanov WO 18 by SEPPIC as well as the mixture octyldodecanol and octyldodecylxyloside marketed under the name FLU-DANOV 20X by SEPPIC.

Mention can also be made of polyolefins with a succinic termination, such as polyisobutylenes with an esterified succinic termination and the salts thereof, in particular the diethanolamine salts, such as the products marketed under the names Lubrizol 2724, Lubrizol 2722 and Lubrizol 5603 by Lubrizol or the commercial product CHEMCINNATE 2000.

The total quantity in emulsifier(s) in the composition A or B (or in the ready-to-use composition) shall preferably have contents in activate material varying from 1 to 8% by weight and more particularly from 2 to 6% by weight relative to the total weight of the composition.

According to a particular embodiment of the invention, the compositions A and/or B (or in the ready-to-use composition) in the form of an emulsion can be prepared according to the reverse phase manufacturing technique. This technique is, in its principle, well known and in particular described in the article "Phase Inversion Emusification", by Th Forster et al, published in Cosmetics & Toiletries, vol. 106, December 1991, pp 49-52. Its principle is as follows:
(i) In the presence of a suitable emulsifying system, with stirring, an oily phase on the one hand and an aqueous phase on the other hand are mixed, said mixture being carried out at a temperature greater than the phase inversion temperature (PIT) of the medium, in such a way as to obtain an emulsion of the water-in-oil type.
(ii) The temperature of the emulsion obtained as such is brought to a temperature less than said phase inversion temperature, this though which an ultrafine emulsion of the oil-in-water type is obtained.
(iii) Mineral nanopigments are then introduced during the implementation of the step (i) and/or at the end of the step (ii).

The suitable systems are emulsifiers of the non-ionic type and are chosen from polyoxyethylenated and/or polyoxypropylenated fatty alcohols (i.e. compounds obtained by a reaction between an aliphatic fatty alcohol, such as behenyl alcohol or cetyl alcohol, with ethylene oxide or propylene oxide or an ethylene oxide/propylene oxide mixture) and the esters of fatty acids and of polyols, optionally polyoxyethylenated and/or polyoxypropylenated (i.e. compounds obtained by a reaction of a fatty acid, such as stearic acid or oleic acid, with a polyol, such as for example an alkyleneglycol or glycerol or a polyglycerol, optionally in the presence of ethylene oxide or propylene oxide or an ethylene oxide/propylene oxide mixture), or mixtures thereof.

Moreover, and preferably, the emulsifying system retained will have a global HLB (HLB=Hydrophilic-Lipophilic Balance, in terms of Griffin; see J. Soc. Cosm. Chem. 1954 (vol 5), pp 249-256; balance between the hydrophilic nature and the lipophilic nature of the surfactant) ranging from 9.5 to about 11.5, advantageously close to 10, in such a way as to make it possible to obtain a phase inversion at a temperature less than 90° C. (TIP<90° C.).

The content in emulsifying agent(s) is between 0.5 and 40% by weight and preferably between 2 and 10% by weight in relation to the total weight of the emulsion.

Oily Phase

The compositions A and/or B (or the ready-to-use composition or the single anhydrous composition) may contain at least one non-water-miscible organic liquid phase, known as a fatty phase. This generally includes one or a plurality of hydrophobic compounds rendering said phase non-miscible in water. Said phase is liquid (in the absence of a structuring agent) at ambient temperature (20-25° C.). Preferentially, the organic liquid phase non-miscible in water according to the invention is generally comprised of at least one volatile oil and/or one non-volatile oil and optionally at least one structuring agent.

"Oil" means a liquid fatty body at ambient temperature (25° C.) and atmospheric pressure (760 mm Hg namely 105 Pa). The oil may be volatile or non-volatile.

The term "volatile oil" according to the invention denotes any oil capable of evaporating in contact with skin or keratin fiber, in less than one hour, at ambient temperature and atmospheric pressure. The volatile oils according to the invention are volatile cosmetic oils, which are liquid at ambient temperature, having a vapor pressure different to zero, at ambient temperature and atmospheric pressure, particularly ranging from 0.13 Pa to 40,000 Pa (10-3 at 300 mm Hg), particularly ranging from 1.3 Pa to 13,000 Pa (0.01 to 100 mm Hg), and more specifically ranging from 1.3 Pa to 1300 Pa (0.01 at 10 mm Hg).

The term "non-volatile oil" denotes an oil remaining on skin or keratin fiber at ambient temperature and atmospheric pressure for at least several hours and particularly having a vapor pressure less than 10-3 mm Hg (0.13 Pa).

The oil may be chosen from any physiologically acceptable and particularly cosmetically acceptable oils, in particular mineral, animal, plant, synthetic oils; in particular, volatile or non-volatile hydrocarbon and/or silicone and/or fluorinated oils and mixtures thereof.

More specifically, the term "hydrocarbon oil" denotes an oil essentially comprising carbon and hydrogen atoms and optionally one or a plurality of functions chosen from hydroxyl, ester, ether, carboxylic functions. Generally, the oil has a viscosity of 0.5 to 100,000 mPa·s, preferably from 50 to 50,000 mPa·s and more preferably from 100 to 300,000 mPa·s.

By way of examples of volatile oils suitable for use in the invention, mention may be made of:

volatile hydrocarbon oils chosen from hydrocarbon oils having 8 to 16 carbon atoms, and particularly petroleum-based C8-C16 isoalkanes (also referred to as isoparaffins) such as isododecane (also referred to as 2,2,4,4,6-pentamethylheptane), isodecane, isohexadecane, and for example the oils sold under the trade names Isopars or Permetyls, C8-C16 branched esters, iso-hexyl neopentanoate, and mixtures thereof. Further volatile hydrocarbon oils such as petroleum distillates, particularly those sold under the name Shell Solt by SHELL, may also be used; volatile linear alkanes such as those described in patent application of Cognis DE10 2008 012 457.

volatile silicones, such as for example volatile linear or cyclic silicone oils, particularly those having a viscosity ≤8 centistokes (8 $10^{-6}$ m²/s), and having in particular 2 to 7 silicon atoms, these silicones optionally comprising alkyl or alkoxy groups having 1 to 10 carbon atoms. Mention may be made, as a volatile silicone oil suitable for use in the invention, in particular, of octamethyl cyclotetrasiloxane, decamethyl cyclopentasiloxane, dodecamethyl cyclohexasiloxane, heptamethyl hexyltrisiloxane, heptamethyloctyl trisiloxane, hexamethyl disiloxane, octamethyl trisiloxane, decamethyl tetrasiloxane, dodecamethyl pentasiloxane and mixtures thereof.

Mention may also be made of volatile alkyl trisiloxanes oils with general formula (I):

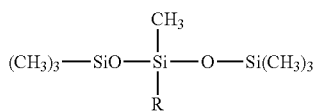

in which R represents an alkyl group comprising 2 to 4 carbon atoms and in which one or several hydrogen atoms can be substituted by a fluorine or chlorine atom.

Among oils with general formula (I), mention may be made of:
3-butyl 1,1,1,3,5,5,5-heptamethyl trisiloxane,
3-propyl 1,1,1,3,5,5,5-heptamethyl trisiloxane, and
3-ethyl 1,1,1,3,5,5,5-heptamethyl trisiloxane,
corresponding to the oils having formula (I) for which R is respectively a butyl group, a propyl group or an ethyl group.

By way of examples of non-volatile oils suitable for use in the invention, mention may be made of:

plant-based hydrocarbon oils such as liquid fatty acid triglycerides having 4 to 24 carbon atoms such as heptanoic or octanoic triglycerides or wheat germ, olive oils, sweet almond, palm, rapeseed, cotton, coconut, alfalfa, poppy seed, pumpkin, squash, blackcurrant seed, evening primrose, millet, barley, *Quinoa*, rye, safflower, candlenut, *Passiflora*, musk rose, sunflower, corn, soybean, squash, grape seed, sesame, hazelnut, apricot, macadamia, castor, avocado oils, caprylic/capric acid triglycerides such as those sold by Stearineries Dubois or those sold under the trade names Miglyol 810, 812 and 818 by SASOL, jojoba oil, shea butter;

linear or branched hydrocarbons of mineral or synthetic origin, such as liquid paraffins and derivatives thereof, petroleum jelly, polydecenes, polybutenes, hydrogenated polyisobutene such as Parleam, squalane;

synthetic ethers having from 10 to 40 carbon atoms;

synthetic esters in particular fatty acids such as the oils having the formula $R_1COOR_2$ wherein $R^1$ represents the residue of a linear or branched higher fatty acid comprising 1 to 40 carbon atoms and $R_2$ represents a hydrocarbon chain, particularly branched containing 1 to 40 carbon atoms with $R_1+R_2 \geq 10$ such as for example Purcellin oil (cetostearyl octanoate)), isononyl isononanoate, isopropyl myristate, isopropyl palmitate, $C_{12}$ to $C_{15}$ alcohol benzoate, hexyl laurate, diisopropyl adipate, isononyl isononanoate, 2-ethylhexyl palmitate, octyl-2-dodecyl stearate, octyl-2-dodecyl erucate, isostearyl isostearate, tridecyl trimellitate; octanoates, decanoates or ricinoleates of alcohols or polyalcohols such as propylene glycol dioctanoate; hydroxylated esters, such as isostearyl lactate, octyl hydroxy stearate, octyldodecyl hydroxystearate, diisostearyl-malate, triisocetyl citrate; heptanoates, octanoates, decanoates of fatty alcohols; polyol esters, such as propylene glycol dioctanoate, neopentyl glycol diheptanoate and diethylene glycol diisononanoate; and pentaerythritol esters such as pentaerythrityl tetraisostearate;

fatty alcohols that are liquid at ambient temperature, with a branched and/or unsaturated carbon chain having 12 to 26 carbon atoms, such as octyldodecanol, isostearyl alcohol, 2-butyloctanol, 2-hexyl decanol, 2-undecylpentadecanol, oleic alcohol;

higher fatty acids, such as oleic acid, linoleic acid, linolenic acid;

fluorinated oils optionally partially hydrocarbon-based and/or silicone-based, such as fluorosilicone oils, fluorinated polyethers or fluorinated silicones, as described in document EP-A-847 752;

silicone oils, such as polydimethylsiloxanes (PDMS) which are non-volatile and linear or cyclic; polydimethylsiloxanes comprising alkyl, alkoxy or phenyl groups which are pendant or at the end of the silicone chain, said groups having from 2 to 24 carbon atoms; phenylated silicones, such as phenyl trimethicones, phenyl dimethicones, phenyltrimethylsiloxydiphenyl-siloxanes, diphenyl dimethicones, diphenylmethyldiphenyl-trisiloxanes or (2-phenylethyl)trimethylsiloxy-silicates; and mixtures thereof.

Solid Fats

The compositions A and/or B (or the ready-to-use composition or the single anhydrous composition) can comprise at least one solid fatty acid chosen preferably from waxes and pasty fatty bodies, and mixtures thereof and more particularly waxes.

Pasty Fats

The term "pasty fatty substance" refers to a lipophilic fatty compound having a reversible solid/liquid change of state, having an anisotropic crystalline organization in the solid state, and comprising a liquid fraction and a solid fraction at a temperature of 23° C.

In other words, the initial melting point of the pasty compound may be less than 23° C. The liquid fraction of the pasty compound measured at 23° C. may represent 9% to 97% by weight of the compound. This liquid fraction at 23°

C. preferably represents between 15% and 85%, more preferably between 40% and 85% by weight. According to the invention, the melting point is equivalent to the temperature of the most endothermic peak observed in thermal analysis (DSC) as described in the standard ISO 11357-3; 1999. The melting point of a paste or a wax may be measured using a differential scanning calorimeter (DSC), for example the calorimeter sold under the name "MDSC 2920" by 45 TA Instruments.

The measurement protocol is as follows: a 5 mg sample of paste or wax (according to the case) placed in a crucible is subjected to a first temperature rise from −20° C. to 100° C., at a heating rate of 10° C./minute, and is then cooled from 100° C. to −20° C. at a cooling rate of 10° C./minute and finally subjected to a second temperature rise from −20° C. to 100° C. at a heating rate of 5° C./minute. During the second temperature rise, the variation in the difference in power absorbed by the empty crucible and by the crucible containing the paste or wax sample as a function of temperature is measured.

The melting point of the compound is the value of the temperature equivalent to the top point of the peak of the curve representing the variation in the difference in power absorbed as a function of temperature.

The liquid fraction by weight of the pasty compound at 23° C. is equal to the ratio of the enthalpy of fusion consumed at 23° C. to the enthalpy of fusion of the pasty compound.

The enthalpy of fusion of the pasty compound is the enthalpy consumed by the compound to change from the solid state to the liquid state. The pasty compound is said to be in the solid state when the entire mass thereof is in solid crystalline form. The pasty compound is said to be in the liquid state when the entire mass thereof is in liquid form.

The enthalpy of fusion of the pasty compound is equal to the area under the curve of the thermogram obtained using differential scanning calorimeter (DSC), such as the calorimeter sold under the name MDSC 2920 by TA instrument, with a temperature rise of 5° C. or 10° C. per minute, according to the ISO 11357-3:1999 standard. The enthalpy of fusion of the pasty compound is the quantity of energy required to change the compound from the solid state to the liquid state. It is expressed in J/g. The enthalpy of fusion consumed at 23° C. is the quantity of energy required by the sample to change from the solid state to the state presented at 23° C. consisting of a liquid fraction and a solid fraction.

The liquid fraction of the pasty compound measured at 32° C. preferably represents 30% to 100% by weight of the compound, preferably 50% to 100%, more preferably 60% to 100% by weight of the compound. If the liquid fraction of the pasty compound measured at 32° C. is equal to 100%, the temperature of the end of the melting range of the pasty compound is less than or equal to 32° C. The liquid fraction of the pasty compound at 32° C. is equal to the ratio of the enthalpy of fusion consumed at 32° C. to the enthalpy of fusion of the pasty compound. The enthalpy of fusion consumed at 32° C. is calculated as for the enthalpy of fusion consumed at 23° C.

The pasty compound is preferably chosen from synthetic compounds and plant-based compounds. A pasty compound may be obtained by means of synthesis from plant-based starting materials. The pasty compound is advantageously chosen from:
lanolin and the derivatives thereof;
polyol ethers chosen from pentaerythritol and polyalkylene glycol ethers, fatty alcohol and sugar ethers, and mixtures thereof, pentaerythritol and polyethylene glycol ether comprising 5 oxyethylene units (5 OE) (CTFA name: PEG-5 Pentaerythrityl Ether), pentaerythritol and polypropylene glycol ether comprising 5 oxypropylene units (5 OP) (CTFA name: PPG-5 Pentaerythrityl Ether), and the mixtures thereof and more specifically the mixture of PEG-5 Pentaerythrityl Ether, PPG-5 Pentaerythrityl Ether and soybean oil, sold under the name "Lanolide" by Vevy, wherein the ratio of the constituents by weight is 46:46:8: 46% PEG-5 Pentaerythrityl Ether, 46% PPG-5 Pentaerythrityl Ether and 8% soybean oil;
optionally polymeric silicone compounds;
optionally polymeric fluorinated compounds;
vinyl polymers, in particular olefin homopolymers and copolymers, hydrogenated diene homopolymers and copolymers, linear or branched oligomers, alkyl (meth) acrylate homo or copolymers preferably having a C8-C30 alkyl group, vinyl ester homo and copolymer oligomers, having C8-C30 alkyl groups, vinyl ether homo and copolymer oligomers, having C8-C30 alkyl groups;
liposoluble polyethers derived from polyetherification between one or a plurality of C2-C100, preferably C2-C50, diols;
esters;
and/or mixtures thereof.

The pasty compound is preferably a polymer, in particular a hydrocarbon.

Of the liposoluble polyethers, preference is given in particular to ethylene-oxide and/or propylene-oxide copolymers with C6-C30 long-chain alkylene-oxides, more preferably such that the weight ratio of ethylene-oxide and/or propylene-oxide with alkylene-oxides in the copolymer is 5:95 to 70:30.

In this family, particular mention may be made of copolymers such as long-chain alkylene-oxides arranged in blocks having a mean molecular weight of 1000 to 10,000, for example a polyoxyethylene/polydodecyl glycol block copolymer such as the dodecanediol (22 mol) and polyethylene glycol (45 OE) ethers marketed under the brand ELFACOS ST9 by Akzo Nobel.

Among the esters, particular preference is given to:
glycerol oligomer esters, namely diglycerol esters, particularly adipic acid and glycerol condensates, for which part of the hydroxyl groups of the glycerols have reacted with a mixture of fatty acids such as stearic acid, capric, stearic acid and isostearic acid and 12-hydroxystearic acid, particularly such as those sold under the brand Softisan 649 by Sasol;
arachidyl propionate sold under the brand Waxenol 801 by Alzo;
phytosterol esters;
triglycerides of fatty acids and derivatives thereof;
pentaerythritol esters;
non-cross-linked polyesters derived from polycondensation between a dicarboxylic acid or a C4-C50 linear or branched carboxylic acid and a diol or an C2-C50 polyol;
aliphatic esters of esters derived from the esterification of an aliphatic hydroxycarboxylic acid ester with an aliphatic carboxylic acid. Preferably, the aliphatic carboxylic acid comprises 4 to 30 and preferably 8 to 30 carbon atoms. It is preferably chosen from hexanoic acid, heptanoic acid, octanoic acid, ethyl-2 hexanoic acid, nonanoic acid, decanoic acid, undecanoic acid, dodecanoic acid, tridecanoic acid, tetradecanoic acid, pentadecanoic acid, hexadecanoic acid, hexyldecanoic acid, heptadecanoic acid, octadecanoic acid, isostearic acid, nonadecanoic acid, eicosanoic acid, isoarachidic acid, octyldodecanoic acid, heneicosanoic acid, docosanoic acid, and mixtures thereof. The aliphatic carboxylic acid is preferably branched. The aliphatic hydroxy carboxylic acid ester is advantageously derived from a hydroxylated aliphatic carboxylic acid comprising 2 to 40 carbon atoms, preferably 10 to 34 carbon atoms and more preferably 12 to 28 carbon atoms, and 1 to 20 hydroxyl groups, preferably 1 to 10 hydroxyl groups and more preferably 1 to 6 hydroxyl groups.

The aliphatic hydroxy carboxylic acid ester is in particular chosen from:
a) partial or total saturated, linear mono-hydroxylated aliphatic monocarboxylic acid esters;
b) partial or total unsaturated, linear mono-hydroxylated aliphatic monocarboxylic acid esters;
c) partial or total saturated non-hydroxylated aliphatic carboxylic polyacid esters;
d) partial or total saturated poly-hydroxylated aliphatic carboxylic polyacid esters;
e) partial or total C2 to C16 aliphatic polyol esters, having reacted with a mono or poly-hydroxylated aliphatic carboxylic mono or polyacid, and mixtures thereof.
  dimer diol and dimer diacid esters, optionally esterified on the alcohol or free acid function(s) thereof by acid or alcohol radicals, particularly dimer dilinoleate esters, such esters may particularly be chosen from esters having the following INCI classification: bis-behenyl/isostearyl/phytosteryl dimerdilinoleyl dimerdilinoleate (Plandool G), phytosteryl/isosteryl/cetyl/stearyl/behenyl dimerdilinoleate (Plandool H or Plandool S), and mixtures thereof;
  hydrogenated rosinate esters, such as dimer dilinoleyl hydrogenated rosinates (Lusplan DD-DHR or DD-DHR from Nippon Fine Chemical); and
  mixtures thereof.

Waxes

According to one preferred embodiment, the composition A and/or B (or the ready-to-use composition or the single anhydrous composition) comprises at least one wax.

Generally, a wax considered in the framework of this invention is a lipophilic compound, which is solid at ambient temperature (25° C.), having a reversible solid/liquid change of state and a melting point greater than or equal to 30° C. of up to 200° C. and particularly up to 120° C. In particular, the waxes suitable for the invention may have a melting point greater than or equal to 45° C., and particularly greater than or equal to 55° C. The waxes suitable for use in the compositions A and/or B (or the ready-to-use composition) are chosen from animal, plant, mineral or synthetic waxes, which are solid at ambient temperature, and mixtures thereof.

Mention can be made for example the following hydrocarbon waxes comprising a fatty alkyl chain having in general from 10 to 60 carbon atoms, preferably from 20 to 40 carbon atoms, said chain able to be saturated or unsaturated, substituted or not, linear, branched or cyclic, preferably saturated and linear:
fatty alcohols;
esters of fatty alcohols;
fatty acids;
fatty acid amides;
fatty acid esters including triglycerides;
fatty acid ethers;
ethoxylated fatty alcohols;
ethoxylated fatty alcohols, and the corresponding salts thereof.

Among the fatty alcohols, mention can be made of stearyl, cetearylic alcohol or mixtures thereof.

Among the esters of fatty alcohols, mention can be made of tri-isostearyl citrate, ethyleneglycol-di-12-hydroxystearate, tristearylcitrate, stearyl octanoate, stearyl heptanoate, trilauryl citrate and mixtures thereof. Among the fatty acid esters, mention can be made of ester waxes, monoglycerides, diglycerides, or triglycerides.

As an ester wax, mention can be made of stearyl stearate, stearyl behenate, stearyl octyldodecanol, cetearyl behenate, behenyl behenate, ethyleneglycol, distearate, ethyleneglycol dimaplimitate. It is possible to use in particular a C20-C40 alkyl (hydroxystearyloxy) stearate (the alkyl group comprising 20 to 40 carbon atoms), alone or in a mixture, may be used as the wax.

Such a wax is particularly sold under the names "Kester Wax K 82 P®", "Hydroxypolyester K 82 PR" and "Kester Wax K 80 P®" by Koster Keunen. Among the triglyceride waxes, mention can be made more particularly of tribehenin, C18-C36 triglyceride, and mixtures thereof.

By way of illustration of waxes suitable for the invention, particular mention may be made of hydrocarbon waxes such as beeswax, lanolin wax, and Chinese insect waxes, rice bran wax, carnauba wax, candelilla wax, ouricury wax, alfa wax, berry wax, shellac wax, Japan wax and sumac wax; montan wax, orange and lemon waxes, microcrystalline waxes, paraffins and ozokerite; polyethylene waxes, waxes obtained by means of Fisher-Tropsch synthesis and waxy copolymers and the esters thereof.

Mention may also be made of waxes obtained by means of the catalytic hydrogenation of animal or plant oils having C8-C32 linear or branched fat chains. Of these, particular mention may be made of isomerized jojoba oil such as the trans isomerized partially hydrogenated jojoba oil manufactured or sold by Desert Whale under the trade name Iso-Jojoba-50®, hydrogenated sunflower oil, hydrogenated castor oil, hydrogenated coconut oil, hydrogenated lanolin oil, and di-(trimethylol-1,1,1 propane) tetrastearate sold under the name Hest 2T-4S® by Heterene.

Mention may also be made of silicone waxes (C30-45 Alkyl dimethicone) and fluorinated waxes. It is also possible to use waxes obtained by hydrogenating esterified castor oil with cetyl alcohol sold under the names Phytowax ricin 16L64® and 22L73® by Sophim. Such waxes are in particular described in the application FR 2 792 190.

As micro-waxes that can be used in the compositions A and/or B, mention can be made in particular of the carnauba micro-waxes such as that marketed under the name Micro-Care 350® by Micro Powders, synthetic wax micro-waxes such as that marketed under the name MicroEase 114S® by Micro Powders, micro-waxes formed from a mixture of carnauba wax and polyethylene wax such as those marketed under the names Micro Care 300® and 310® by Micro Powders, micro-waxes formed from a mixture of carnauba wax and of synthetic wax such as that marketed under the name Micro Care 325® by Micro Powders, polyethylene micro-waxes such as those marketed under the names Micropoly 200®, 220®, 220L® and 250SR by Micro Powders and polytetrafluoroethylene micro-waxes such as those marketed under the names Microslip 519® and 519 L® by Micro Powders.

The composition A and/or B (or the ready-to-use composition or the single anhydrous composition) can comprise a content in solid fatty bodies ranging preferably from 1% to 30% by weight, and in particular from 2% to 20% by weight relative to the total weight of the composition.

Additives

The compositions A and/or B (or the ready-to-use composition or the single anhydrous composition) can also comprise in addition to the additional cosmetic agents.

The cosmetic compositions A and/or B (or the ready-to-use composition or the single anhydrous composition) can furthermore comprise cosmetic additives chosen from among opacifiers, stabilizers, preservatives, perfume, solar filters, cosmetic active agents, fillers, suspension agents, sequestrants, coloring materials or any other ingredient routinely used in cosmetics for this type of application.

Obviously, an expert in the subject will take care to choose the optional compound(s) in such a way that the advantageous properties intrinsically associated with the composition A or B or with the ready-to-use composition or with the single anhydrous composition, are not altered, or are not substantially altered, by the envisaged additive(s).

Organic Powder

According to a particular embodiment of the invention, the compositions A and/or B (or the ready-to-use composition or the single anhydrous composition) will contain in addition an organic powder.

In this application, the term "organic powder" denotes any insoluble solid in the medium at ambient temperature (25° C.).

As organic powders that can be used, mention can be made for example of polyamide particles, particularly those sold under the trade name ORGASOL by Atochem; nylon fibers 6,6 in particular the polyamide fibers marketed by Etablissements P Bonte under the name Polyamide 0.9 Dtex 0.3 mm (INCI name: Nylon 6,6 or Polyamide-6,6) having an average diameter of 6 μm, a weight of about 0.9 dtex and a length ranging from 0.3 mm to 1.5 mm; polyethylene powders; microspheres based on acrylic copolymers, such as those made of ethylene glycol dimethacrylate/lauryl methacrylate copolymer sold by Dow Corning under the trade name POLYTRAP; polymethyl methacrylate microspheres, marketed under the trade name MICROSPHERE M-100 by Matsumoto or under the trade name COVABEAD LH85 by Wackherr; hollow polymethyl methacrylate microspheres (granulometry: 6.5-10.5μ) marketed under the trade name GANZPEARL GMP 0800 by Ganz Chemical; microbeads made of ethylene glycol dimethacrylate/lauryl methacrylate copolymer (size: 6.5-10.5μ) marketed under the trade name GANZPEARL GMP 0820 by Ganz Chemical or MICROSPONGE 5640 by Amcol Health & Beauty Solutions; ethylene-acrylate copolymer powders, such as those marketed under the trade name FLOBEADS by Sumitomo Seika Chemicals; expanded powders such as hollow microspheres and in particular, the microspheres formed from a terpolymer of polyvinylidene/acrylonitrile/methacrylate and marketed under the trade name EXPANCEL by Kemanord Plast under the references 551 DE 12 (granulometry of about 12 μm and density 40 kg/m$^3$), 551 DE 20 (granulometry of about 30 μm and density 65 kg/m$^3$), 551 DE 50 (granulometry of about 40 μm), or the microspheres marketed under the trade name MICROPEARL F 80 ED by Matsumoto; powders of natural organic materials such as starch powders, in particular starch powders, in particular corn, wheat or rice starch, optionally cross-linked, such as starch powders cross-linked by octenylsuccinate anhydride, marketed under the trade name DRY-FLO by National Starch; silicone resin microbeads such as those marketed under the trade name TOSPEARL by Toshiba Silicone, in particular TOSPEARL 240; amino acid powders such as the Lauroyllysine powder marketed under the trade name AMIHOPE LL-11 by Ajinomoto; particles of the microdispersion of wax, which preferably have average dimensions less than 1 μm and in particular ranging from 0.02 μm to 1 μm, and which are substantially comprised of a wax or of a mixture of waxes, such as the products marketed under the trade name Aquacer by Byk Cera, and in particular: Aquacer 520 (mixture of natural and synthetic waxes), Aquacer 514 or 513 (polyethylene wax), Aquacer 511 (polymer wax), or such as the products marketed under the trade name Jonwax 120 by Johnson Polymer (mixture of polyethylene waxes and of paraffin) and under the trade name Ceraflour 961 by Byk Cera (micronized modified polyethylene wax); and mixtures thereof.

Hydrophilic Thickeners

According to one advantageous embodiment, the composition A and/or B (or the ready-to-use composition) may further comprise at least one thickener. Such a thickener is preferably soluble or dispersible in water The thickeners can be of natural or synthetic, mineral or organic origin.

The thickeners will preferably be anionic, zwitterionic or non-ionic polymers, associative or not.

The thickeners can be chosen from cellulose derivatives such as hydroxyethylcellulose; polysaccharides and in particular gums such as xanthan gum, *Sclerotium* gum.

Associative polyurethanes are non-ionic sequenced copolymers comprising in the chain, both hydrophilic sequences generally polyoxyethylenated in nature (the polyurethanes can then be called polyether polyurethanes) and hydrophobic sequences which may be aliphatic chains alone and/or cycloaliphatic and/or aromatic chains.

In particular, these polymers comprise at least two hydrocarbon lipophilic chains, having 6 to 30 carbon atoms, separated by a hydrophilic sequence, the hydrocarbon chains may be pendant chains or hydrophilic sequence end chains. In particular, one or a plurality of pendant chains may be envisaged. Moreover, the polymer may comprise a hydrocarbon chain at one end or at both ends of a hydrophilic sequence.

Associative polyurethanes may be sequenced in triblock or multiblock form. The hydrophobic sequences may thus be at each end of the chain (for example: triblock copolymer having hydrophilic central sequence) or distributed both at the end and in the chain (multisequenced copolymer for example). These polymers may also be grafted or star polymers. Preferably, associative polyurethanes are triblock copolymers of which the hydrophilic sequence is a polyoxyethylenated chain comprising 50 to 1000 oxyethylenated groups. In general associative polyurethanes comprise a urethane bond between the hydrophilic sequences, hence the name.

According to an embodiment, use is made as a gelling agent a non-ionic associative polymer of the polyurethane type.

As examples of non-ionic polyether polyurethanes with fatty chain that can be used in the invention, use can also be made of Rheolate® FX 1100 or Rheoluxe® 811 (Steareth-100/PEG-136/HDI (hexamethyl diisocyanate) copolymer), Rheolate® 205 with urea function sold by ELEMENTIS or Rheolates® 208, 204 or 212, as well as Acrysol RM 184® or Acrysol RM 2020.

Mention can also be made of the product ELFACOS T210® with C12-C14 alkyl chain and the product ELFACOS T212® with C16-18 alkyl chain (PPG-14 Palmeth-60 Hexyl Dicarbamate) from AKZO.

The product DW 1206BR from ROHM & HAAS with C20 alkyl chain and urethane bond, proposed at 20% dry material in water, can also be used.

Solutions or dispersions of these polymers can also be used in particular in water or in a hydroalcoholic medium. As an example of such polymers, mention can be made of RHEOLATER 255, RHEOLATER 278 and RHEOLATER 244 sold by ELEMENTIS. The DW 1206F product and the DW 1206J product proposed by the ROHM & HAAS Company can also be used.

The associative polyurethanes that can be used according to the invention are in particular those described in the article by G. Fonnum, J. Bakke and Fk. Hansen-Colloid Polym. Sci 271, 380.389 (1993).

Use may also be made of an associative polyurethane suitable for being obtained by means of polycondensation of at least three compounds comprising (i) at least one polyethylene glycol comprising 150 to 180 moles of ethylene oxide, (ii) stearyl alcohol or decyl alcohol and (iii) at least one diisocyanate.

Such polyether polyurethanes are sold in particular by ROHM & HAAS under the names ACULYN 46® and ACULYN 44® [ACULYN 46® is a polycondensate of polyethyleneglycol at 150 or 180 moles of ethylene oxide, stearyl alcohol and methylene bis(4-cyclohexyl-isocyanate) (SMDI), at 15% by weight in a matrix of maltodextrin (4%) and water (81%); ACULYN 44® is a polycondensate of polyethyleneglycol at 150 or 180 moles of ethylene oxide, of decyl alcohol and of methylene bis(4-cyclohexylisocyanate) (SMDI), at 35% by weight in a mixture of propyleneglycol (39%) and of water (26%)].

Solutions or dispersions of these polymers can also be used in particular in water or in a hydroalcoholic medium. As an example, of such polymers mention can be made of RHEOLATE FX1010®, RHEOLATE FX1035® and RHEOLATE 1070® from ELEMENTIS, RHEOLATE 255®, RHEOLATE 278® and RHEOLATE 244® sold by ELEMENTIS. It is also possible to use the products ACULYN 44, ACULYN 46®, DW 1206FR and DW 1206JR, as well as Acrysol RM 184 from ROHM & HAAS, or BORCHI GEL LW 44® from BORCHERS, and mixtures thereof.

Preferably, a non-ionic associative polyether polyurethane is used such as the one sold in particular by ELEMENTIS under the name RHEOLATE FX 1100R or RHEOLUXE 811® which is a polycondensate of polyethyleneglycol at 136 moles of ethylene oxide, of polyoxyethylenated stearyl alcohol at 100 moles of ethylene oxide and of hexamethylene diisocyanate (HDI) having a mean molecular weight by weight of 30,000 (INCI name: Steareth-100/PEG-136/HDI Copolymer).

The thickeners are generally present in the composition A and/or B (or in the ready-to-use composition) at a content ranging from 0% to 20% by weight, preferably from 0% to 10% by weight, and most preferably from 0% to 7% by weight, with respect to the total weight of the composition.

Lipophilic Thickeners

By way of example of a mineral lipophilic gelling agent, mention may be made of optionally modified clays such as hectorites modified by a C10 to C22 ammonium chloride, such as hectorite modified with di-stearyl di-methyl ammonium chloride such as, for example, that marketed under the name Bentone 38VR by ELEMENTIS.

Mention may also be made of pyrogenic silica optionally with a hydrophobic surface treatment wherein the particle size is less than 1 µm. Indeed, it is possible to modify the surface of the silica chemically, by means of a chemical reaction giving rise to a reduction in the silanol groups present on the silica surface. The silanol groups may particularly be substituted with hydrophobic groups: a hydrophobic silica is thus obtained. The hydrophobic groups can be trimethylsiloxyl groups, particularly obtained by treating pyrogenic silica in the presence of hexamethyldisilazane. Silicas treated in this way are referred to as "Silica silylate" as per the CTFA (8th edition, 2000). They are for example marketed under the references Aerosil R812® by DEGUSSA, CAB-O-SIL TS-530® by CABOT, dimethylsilyloxyl or polydimethylsiloxane groups, particularly obtained by treating pyrogenic silica in the presence of polydimethylsiloxane or dimethyldichlorosilane. Silicas treated in this way are referred to as "Silica dimethyl silylate" as per the CTFA (8th edition, 2000). They are for example sold under the references Aerosil R972®, and Aerosil R974® by DEGUSSA, CAB-O-SIL TS-610® and CAB-O-SIL TS-720® by CABOT.

The hydrophobic pyrogenic silica particularly has a particle size that may be nanometric to micrometric, for example ranging from approximately 5 to 200 nm.

The polymeric organic lipophilic gelling agents are, for example, partially or totally cross-linked elastomeric organopolysiloxanes with a three-dimensional structure, such as those sold under the names KSG6®, KSG16® and KSG18® by SHIN-ETSU, Trefil E-505C® and Trefil E-506CR by DOW-CORNING, Gransil SR-CYC®, SR DMF10®, SR-DC556®, SR 5CYC Gel®, SR DMF 10 Gel® and SR DC 556 Gel® by GRANT INDUSTRIES, SF 1204® and JK 113® by GENERAL ELECTRIC; ethylcellulose such as that sold under the trade name Ethocel® by DOW CHEMICAL; galactomannans containing from one to six, and in particular from two to four, hydroxyl groups per ose, substituted with a saturated or unsaturated alkyl chain, such as guar gum alkylated with C1 to C6 alkyl chains, and C1 to C3 in particular and mixtures thereof. Block copolymers of the "diblock", "triblock" or "radial" type, of the polystyrene/polyisoprene or polystyrene/polybutadiene type, such as those marketed under the trade name Luvitol HSBR by BASF, of the polystyrene/copoly(ethylene-propylene) type, such as those marketed under the name Kraton® by SHELL CHEMICAL CO or of the polystyrene/copoly(ethylene-butylene) type, mixtures of triblock and radial (star) copolymers in isododecane, such as those marketed by PENRECO under the trade name Versagel® for instance the mixture of butylene/ethylene/styrene triblock copolymer and of ethylene/propylene/styrene star copolymer in isododecane (Versagel M 5960).

As a lipophilic gelling agent, mention can further be made of polymers of mean molar mass by weight less than 100,000, comprising a) polymeric backbone that has hydrocarbon repeat units provided with at least one heteroatom, and optionally b) at least one pendant fatty chain and/or at least one terminal fatty chain that may be functionalized, having from 6 to 120 carbon atoms and being linked to these hydrocarbon patterns, such as those described in applications WO-A-02/056847, WO-A-02/47619 in particular resins of polyamides (in particular comprising alkyl groups having from 12 to 22 carbon atoms) such as those described in U.S. Pat. No. 5,783,657.

Among the lipophilic gelling agents suitable for use, mention may also be made of dextrin and fatty acid esters, such as dextrin palmitates, particularly such as those sold under the names Rheopearl TL® or Rheopearl KL® by CHIBA FLOUR.

Use can also be made of polyorganosiloxane type silicone polyamides such as those described in the documents U.S. Pat. Nos. 5,874,069, 5,919,441, 6,051,216 and 5,981,680.

These silicone polyamides can belong to the following two families:
- polyorganosiloxanes comprising at least two amide groups capable of establishing hydrogen interactions, with these two groups being located in the chain of the polymer, and/or
- polyorganosiloxanes comprising at least two amide groups capable of establishing hydrogen interactions, with these two groups being located on grafts or branches.

Suspension Agents

The compositions A and/or B (or the ready-to-use composition or the single anhydrous composition) can furthermore contain one or several suspension agents and/or one or several gelling agents. Some of them can play both roles at the same time.

Among the agents that can be used as a suspension agent and/or as a lipophilic gelling agent, mention can be made of clays, in the form of powder or in the form of an oily gel; said clays optionally able to be modified in particular modified montmorillonites clays such as modified hydrophobic bentonites or hectorites such as the hectorites modified by a C10 to C22 ammonium chloride, such as hectorite modified with di-stearyl di-methyl ammonium chloride such as, for example, the product Disteardimonium Hectorite (CTFA name) (reaction product of hectorite and of disteardimonium chloride) sold under the name of Bentone 38 or Bentone Gel by Elementis Specialities. Mention can be made for example of the product Stearalkonium Bentonite (CTFA name) (reaction product of bentonite and stearalkonium chloride quaternary ammonium) such as the commercial product sold under the name TIXOGEL MP 250® by Sud Chemie Rheologicals, United Catalysts Inc.

Use can also be made of hydrotalcites, in particular modified hydrophobic hydrotalcites such as for example the products sold under the name of Gilugel by BK Giulini.

Mention may also be made of pyrogenic silica optionally with a hydrophobic surface treatment wherein the particle size is less than 1 µm. Indeed, it is possible to modify the surface of the silica chemically, by means of a chemical reaction giving rise to a reduction in the silanol groups present on the silica surface. The silanol groups may particularly be substituted with hydrophobic groups: a hydrophobic silica is thus obtained. The hydrophobic groups can be trimethylsiloxyl groups, particularly obtained by treating pyrogenic silica in the presence of hexamethyldisilazane. Silicas treated in this way are referred to as "Silica silylate" as per the CTFA (8th edition, 2000). They are for example marketed under the references Aerosil R812® by DEGUSSA, CAB-O-SIL TS-530® by CABOT, dimethylsilyloxyl or polydimethylsiloxane groups, particularly obtained by treating pyrogenic silica in the presence of polydimethylsiloxane or dimethyldichlorosilane. Silicas treated in this way are referred to as "Silica dimethyl silylate" as per the CTFA (8th edition, 2000). They are for example sold under the references Aerosil R972®, and Aerosil R974® by DEGUSSA, CAB-O-SIL TS-610® and CAB-O-SIL TS-720® by CABOT.

The hydrophobic pyrogenic silica particularly has a particle size that may be nanometric to micrometric, for example ranging from approximately 5 to 200 nm.

According to a particular form of the invention, the suspension agents or gelling agents can be activated by oils such as propylene carbonate, triethylcitrate.

The quantities of these different constituents that can be present in the composition A and/or B (or in the ready-to-use composition or in the single anhydrous composition) are those conventionally used in compositions for the treatment of perspiration.

The suspension agents are present preferably in quantities ranging from 0.1% to 5% by weight and more preferably from 0.2 to 2% by weight with respect to the total weight of the composition.

The quantities of these different constituents that can be present in the cosmetic compositions A and/or B (or in the ready-to-use composition or in the single anhydrous composition) are those conventionally used in compositions for the treatment of perspiration.

Aerosols

The compositions A and/or B can also be pressurized and be packaged in an aerosol device, in particular comprising at least one propellant.

The propellant used is chosen preferably from dimethylether, volatile hydrocarbons such as propane, isopropane, n-butane, isobutane, n-pentane and isopentane and mixtures thereof, optionally with at least one chlorinated and/or fluorinated hydrocarbon; of the latter, mention may be made of the compounds sold by Dupont de Nemours under the trade names Freon® and Dymel®, and in particular monofluorotrichloromethane, difluorodichloromethane, tetrafluorodichloroethane and 1,1-difluoroethane particularly sold under the trade name DYMEL 152 AR by DUPONT.

Carbon dioxide, nitrous oxide, nitrogen or compressed air may also be used as a propellant.

Preferably, the propellant is chosen from the volatile hydrocarbons.

More preferably, the propellant is chosen from isopropane, n-butane, isobutane, pentane and isopentane and mixtures thereof.

The weight ratio between the liquid phase and the propellant gas varies in a ratio from 5/95 to 50/50, preferably from 10/90 to 40/60, and more preferably from 15/85 to 30/70.

According to the invention, the propellant concentration generally varies from 5 to 95% by pressurized mass and more preferentially from 50 to 85% by mass in relation to the total mass of the pressurized A and/or B composition.

The dispensing means, forming part of the aerosol device, generally consist of a dispensing valve controlled by a dispensing head, in turn comprising a nozzle via which the mixture of the composition A and of the composition B is sprayed. The receptacle containing each pressurized composition A and B may be opaque or transparent. It may be made of glass, polymeric or metal material, optionally coated with a layer of protective varnish.

Throughout the description, including the claims, the expression "comprising a" must be understood as being synonymous with "comprising at least one", unless mentioned otherwise.

The expressions "between . . . and . . . " and "ranging from . . . to . . . " are to be understood to be inclusive of the limits, unless specified otherwise.

In the description and the examples, unless mentioned otherwise, the percentages are weight percentages. The percentages are therefore expressed by weight in relation to the total weight of the composition. The temperature is expressed in degrees Celsius unless mentioned otherwise, and the pressure is the atmospheric pressure, unless mentioned otherwise.

The invention is illustrated in more detail by the non-limiting examples presented hereinafter.

The examples that follow are used to illustrate this invention. The quantities are indicated as percentages by weight in relation to the total weight of the composition.

EXAMPLES 1 TO 11: INFLUENCE OF THE CHOICE OF THE MODULATING AGENT

The following compositions are prepared by mixing ingredients of the composition A on one side, and a mixture of the ingredients of the composition B on the other.

Then the composition B is introduced into the composition A with magnetic stirring.

The precipitation reaction time is measured according to the following protocol: the stopwatch is started after the mixing of the compositions A and B in the same volume, until a precipitate can be seen:

| Ingredients | Comparative 1 composition A (out of invention) | Composition A1 | Composition A2 |
|---|---|---|---|
| $CaCl_2$ [1] | 7.33% | 7.33% | 7.33% |
| ascorbic acid [2] | — | 2% | — |
| citric acid [3] | — | — | 1% |
| Water | Qsp100 | Qsp100 | Qsp100 |

| Ingredients | Composition B1 |
|---|---|
| $NaHCO_3$ [4] | 4.2% |
| Water | Qsp100 |

| Precipitation reaction time | | |
|---|---|---|
| Between the comparative 1 composition A and composition B1 | Between compositions A1 and B1 | Between compositions A2 and B1 |
| <0.5 s | 32 s | 2280 s |

[1] sold under the trade name CALCIUM CHLORIDE DIHYDRATE EMPROVE PH by MERCK
[2] sold under the trade name VC ASCORBIC ACID 100 MESH (95%) 50 1584 2 by DSM NUTRITIONAL PRODUCTS
[3] sold under the trade name CITRIC ACID MONOHYDRATE by CITURGIA BIOCHEMICALS
[4] sold under the trade name BICAR FOOD by SOLVAY

[1] sold under the trade name CALCIUM CHLORIDE DIHYDRATE EMPROVE PH by MERCK
[2] sold under the trade name VC ASCORBIC ACID 100 MESH (95%) 50 1584 2 by DSM NUTRITIONAL PRODUCTS
[3] sold under the trade name CITRIC ACID MONOHYDRATE by CITURGIA BIOCHEMICALS
[4] sold under the trade name BICAR FOOD by SOLVAY The results show as such that the precipitation reaction between the compositions A1 and B1 on the one hand, and A2 and B1 on the other hand (therefore with a modulating agent according to the invention), is done in a much slower manner that between the comparisons 1 compositions A and B1 (without modulating agent).

| Ingredients | Composition A3 | Composition A4 | Composition A5 | Composition A6 | Composition A7 |
|---|---|---|---|---|---|
| $CaCl_2$ [1] | 7.33% | 7.33% | 7.33% | 7.33% | 7.33% |
| lactic acid [2] | 2% | — | — | — | — |
| Propionic acid [3] | — | 1% | 2% | — | — |
| Tartaric acid [4] | — | — | — | 1% | 2% |
| Water | Qsp100 | Qsp100 | Qsp100 | Qsp100 | Qsp100 |

| Ingredients | Composition B1 |
|---|---|
| $NaHCO_3$ [5] | 4.2% |
| Water | Qsp100 |

| | Between compositions A3 and B1 | Between compositions A4 and B1 | Between compositions A5 and B1 | Between compositions A6 and B1 | Between compositions A7 and B1 |
|---|---|---|---|---|---|
| Precipitation reaction time | 68 s | 40 s | 43 s | 75 s | 78 s |

[1] sold under the trade name CALCIUM CHLORIDE DIHYDRATE EMPROVE PH by MERCK
[2] sold under the trade name PURAC FCC 88 by PURAC
[3] sold under the trade name PROPIONIC ACID by MERCK
[4] sold under the trade name NATURAL TARTARIC ACID by INDUSTRIA CHIMICA VALENZANA
[5] sold under the trade name BICAR FOOD by SOLVAY In the same way as hereinabove, the results show that the precipitation reaction between the compositions A3 and B1, or A4 and B1, or A5 and B1 or A6 and B1 or A7 and B1 (therefore with a modulating agent according to the invention), is done in a much slower manner that between the comparisons 1 compositions A and B (without modulating agent).

| Ingredients | Comparative 2 composition A (out of invention) | Composition A8 | Composition A9 | Composition A10 |
|---|---|---|---|---|
| $CaCl_2$ [1] | 1.47% | 1.47% | 1.47% | 1.47% |
| AD1 [2] | — | 0.056% | — | — |
| AD2 [3] | — | — | 0.083% | — |
| AD3 [4] | — | — | — | 0.083% |
| Water | Qsp100 | Qsp100 | Qsp100 | Qsp100 |

| Ingredients | Composition B2 |
|---|---|
| $NaHCO_3$ [5] | 0.84% |
| Water | Qsp100 |

| | Between the comparative 2 composition A and composition B2 | Between compositions A8 and B2 | Between compositions A9 and B2 | Between compositions A10 and B2 |
|---|---|---|---|---|
| Precipitation reaction time | <30 s | 120 s | 660 s | 480 s |

[1] sold under the trade name CALCIUM CHLORIDE DIHYDRATE EMPROVE PH by MERCK
[2] sold under the trade name AQUADEW SPA-30 by AJINOMOTO
[3] sold under the trade name SOKALAN CP42 by BASF
[4] sold under the trade name SOKALAN CP44 by BASF
[5] sold under the trade name BICAR FOOD by SOLVAY Here again, the results show as such that the precipitation reaction between the compositions A8 and B2, or A9 and B2, or A10 and B2 (therefore with a modulating agent according to the invention), is done in a much slower manner that between the comparisons 2 compositions A and B2 (without modulating agent).

| Ingredients | Composition A11 |
|---|---|
| $MgCl_2$ [1] | 10% |
| citric acid [2] | 1% |
| Sodium citrate [3] | 3.2% |
| Water | Qsp100 |

| Ingredients | Composition B3 |
|---|---|
| $Na_2HPO_4$ [4] | 7.7% |
| Water | Qsp100 |

| | |
|---|---|
| Precipitation reaction time between compositions A11 and B3 | >7 s |

[1] sold under the trade name MAGNESIUM CHLORIDE HEXA-HYDRATE by DR PAUL LOHMANN
[2] sold under the trade name CITRIC ACID MONOHYDRATE by CITURGIA BIO-CHEMICALS
[3] sold under the trade name CITRATE TRISODIQUE DIHYDRATE FINE F 6000 by JUNGBUNZLAUER
[4] sold under the trade name DISODIUM PHOSPHATE by BK GIULINI CHEMIE

EXAMPLE 12: COMPOSITION A IN A FIRST EMULSION FORMULA

The composition A12 tested comprises a base manufactured according to the method described hereinbelow and containing the ingredients mentioned in the following table. The application mode of this composition is described in example 25:

| Phase | Ingredients | Preparation Invention Composition A12 |
|---|---|---|
| P3 | Magnesium chloride hexahydrate[1] | 10 |
| P3 | Citric Acid[2] | 1 |
| P3 | Sodium citrate[3] | 3.2 |
| P2 | Cetearyl Alcohol[4] | 2.5 |
| P2 | Ceteareth-33[5] | 1.25 |
| P2 | Dimethicone[6] | 0.5 |
| P1 | Pentylene Glycol[7] | 0.5 |
| P1 | Phenoxyethanol[8] | 0.5 |
| P1 | Water | QSP |

[1] MAGNESIUM CHLORIDE HEXAHYDRATE DR PAUL LOHMANN
[2] sold under the trade name CITRIC ACID MONOHYDRATE by CITURGIA BIO-CHEMICALS
[3] sold under the trade name CITRATE TRISODIQUE DIHYDRATE FINE F 6000 by JUNGBUNZLAUER
[4] sold under the trade name LANETTE D by BASF
[5] sold under the trade name SIMULSOL CS ECAILLES by SEPPIC
[6] sold under the trade name BELSIL DM 350 by WACKER
[7] sold under the trade name 616751 HYDROLITE-5 by SYMRISE
[8] sold under the trade name SEPICIDE LD by SEPPIC The phase P1 is heated to 75° C. and the phase P2 is melted at 75° C. The phase P2 was slowly introduced into the phase P1 with stirring for 15 minutes. At 40° C. P3 was introduced and stirred in order to obtain good homogenization. The formula is stable at least 24 hours.

EXAMPLE 13: COMPOSITION A IN A SECOND EMULSION FORMULA

The composition A13 tested comprises a base manufactured according to the method described hereinbelow and containing the ingredients mentioned in the following table. The application mode of this composition is described in example 25:

| Phase | Ingredients | Preparation Invention Composition A13 |
|---|---|---|
| P1 | Water | QSP |
| P1 | Steareth-100/PEG-136/HDI Copolymer[1] | 1 |
| P2 | C14-22 Alcohols (and) C12-20 Alkyl Glucoside [2] | 3 |
| P2 | Dimethicone[3] | 7 |
| P3 | Magnesium chloride[4] | 10 |
| P3 | Citric Acid[5] | 1 |
| P3 | Sodium citrate[6] | 3.2 |
| P4 | Phenoxyethanol[7] | 0.5 |
| P4 | Caprylyl Glycol[8] | 0.2 |

[1] sold under the trade name RHEOLUXE 811 by ELEMENTIS
[2] sold under the trade name MONTANOV L by SEPPIC
[3] sold under the trade name BELSIL DM 350 by WACKER
[4] MAGNESIUM CHLORIDE 6-HYDRATE DR PAUL LOHMANN
[5] sold under the trade name CITRIC ACID MONOHYDRATE by CITURGIA BIO-CHEMICALS
[6] sold under the trade name CITRATE TRISODIQUE DIHYDRATE FINE F 6000 by JUNGBUNZLAUER
[7] sold under the trade name SEPICIDE LD by SEPPIC
[8] sold under the trade name 199602 HYDROLITE CG by SYMRISE The phase P1 is heated to 80° C. The phase P2 is heated to 80° C. Once P1 and P2 homogenized and at 80° C., the phase P2 was slowly introduced into the phase P1 with stirring for 15 minutes. P3 was introduced and stirred in order to obtain good homogenization. At 40° C., the phase P4 was added to the mixture with stirring until complete cooling of the manufacture (Final temperature=25° C.). The formula is stable at least 24 hours.

EXAMPLE 14: COMPOSITION A IN A FIRST HYDROALCOHOLIC FORMULA

The composition A14 tested comprises a base manufactured according to the method described hereinbelow and containing the ingredients mentioned in the following table. The application mode of this composition is described in example 25:

| Phase | Ingredients | Preparation Invention Composition A14 |
|---|---|---|
| P1 | Magnesium chloride[1] | 10 |
| P1 | Citric Acid[2] | 1 |
| P1 | Sodium citrate[3] | 3.2 |
| P1 | Water | 10 |
| P2 | PPG-26-Buteth-26 (and) PEG-40 Hydrogenated castor oil[4] | 3 |
| P1 | HydroxyEthylCellulose[5] | 0.5 |
| P3 | Denatured Alcohol [6] | 20 |
| P3 | Water | QSP |

[1]MAGNESIUM CHLORIDE6-HYDRATE DR PAUL LOHMANN
[2]sold under the trade name CITRIC ACID MONOHYDRATE by CITURGIA BIO-CHEMICALS
[3]sold under the trade name CITRATE TRISODIQUE DIHYDRATE FINE F 6000 by JUNGBUNZLAUER
[4]sold under the trade name SOLUBILISANT LRI by SENSIENT
[5]sold under the trade name NATROSOL 250 HHR PC by ASHLAND
[6] sold under the trade name ETHANOL S96 DENATURE BITREX/TERTIO by France Alcools The phase P1 was introduced hot into water and stirred for 30 minutes. The phase P2 was slowly introduced at 40° C. into the phase P1 with stirring for 15 minutes. At 30° C., P3 was added and stirred in order to obtain good homogenization. The formula is stable at least 24 hours.

EXAMPLE 15: COMPOSITION A IN A SECOND HYDROALCOHOLIC FORMULA

The composition A15 tested comprises a base manufactured according to the method described hereinbelow and containing the ingredients mentioned in the following table. The application mode of this composition is described in example 25:

| Phase | Ingredients | Preparation Invention Composition A15 |
|---|---|---|
| P1 | Water | QSP |
| P1 | Magnesium Chloride[1] | 10 |
| P1 | Citric acid[2] | 1 |
| P1 | Sodium citrate[3] | 3.2 |
| P2 | Hydroxyethylcellulose [4] | 0.55 |
| P4 | Denatured Alcohol[5] | 16.54 |
| P3 | PEG-60 Hydrogenated Castor Oil[6] | 1.2 |

[1]MAGNESIUM CHLORIDE6-HYDRATE DR PAUL LOHMANN
[2]sold under the trade name CITRIC ACID MONOHYDRATE by CITURGIA BIO-CHEMICALS
[3]sold under the trade name CITRATE TRISODIQUE DIHYDRATE FINE F 6000 by JUNGBUNZLAUER
[4]sold under the trade name NATROSOL 250 HHR PC by ASHLAND
[5]sold under the trade name ETHANOL S96 DENATURE BITREX/TERTIO sold under the trade name FRANCE ALCOOLS
[6]sold under the trade name EUMULGIN CO 60 by BASF The phase P1 is heated to 50° C. The phase P2 is added with stirring until a homogeneous phase is obtained. The phase P3 was melted at 40° C. and it was added to the phase P1+P2 with stirring at 40° C. The temperature was allowed to return to ambient temperature with stirring and the phase P4 is added. The formula is stable at least 24 hours.

EXAMPLES 16-17: COMPOSITION A AND COMPOSITION B SEPARATELY IN A REVERSE EMULSION FORMULA

Compositions A16 and B4 tested comprise a base manufactured according to the method described hereinbelow and containing the ingredients mentioned in the following table. The application mode of these compositions is described in example 25:

| Phase | Ingredients | Preparation Invention Composition A16 |
|---|---|---|
| P1 | Water | QSP |
| P1 | Magnesium chloride [1] | 10 |
| P1 | Citric Acid [2] | 1 |
| P1 | Sodium citrate [3] | 3.2 |
| P1 | Phenoxyethanol [5] | 0.7 |
| P2 | PEG-30 Dipolyhydroxystearate [6] | 0.8 |
| P2 | Dicaprilylcarbonate [7] | 6 |
| P2 | Isopropyl Palmitate [8] | 10 |
| P2 | PolyC10-30 alkylacrylate [9] | 0.1 |
| P2 | Lauryl PEG/PPG-18/18 methicone (and) Dodecene (and) Poloxamer 407 [10] | 0.4 |

| Phase | Ingredients | Preparation Invention Composition B4 |
|---|---|---|
| P1 | Water | QSP |
| P1 | Dipotassium Phosphate [4] | 10 |
| P1 | Phenoxyethanol [5] | 0.7 |
| P2 | PEG-30 Dipolyhydroxystearate [6] | 0.8 |
| P2 | Dicaprilylcarbonate [7] | 6 |
| P2 | Isopropyl Palmitate [8] | 10 |
| P2 | PolyC10-30 alkylacrylate [9] | 0.1 |
| P2 | Lauryl PEG/PPG-18/18 methicone (and) Dodecene (and) Poloxamer 407 [10] | 0.4 |

[1] MAGNESIUM CHLORIDE6-HYDRATE DR PAUL LOHMANN
[2] sold under the trade name CITRIC ACID MONOHYDRATE by CITURGIA BIO-CHEMICALS
[3] sold under the trade name CITRATE TRISODIQUE DIHYDRATE FINE F 6000 by JUNGBUNZLAUER
[4] sold under the trade name DI POTASSIUM HYDROGEN PHOSPHATE ANHYDROUS EMPROVE EXP PH EU R, BP, E340 by MERCK
[5] sold under the trade name SEPICIDE LD by SEPPIC
[6] sold under the trade name CITHROL DPHS-SO-(MV) by CRODA
[7] sold under the trade name CETIOL CC by BASF
[8] sold under the trade name ISOPROPYL PALMITATE/MB by BASF
[9] sold under the trade name INTELIMER IPA 13-1 NG POLYMER by EVONIK (AIR PRODUCTS)
[10] sold under the trade name DOW CORNING 5200 FORMULATION AID by DOW CORNING For each composition A16 and B4 the protocol is as follows:

The phase P1 is homogenized at ambient temperature. The phase B is heated to 60° C. Once P1 and P2 homogenized, the phase P1 was slowly introduced into the phase P2 with stirring for 10 minutes. Each formula is stable at least 24 hours.

EXAMPLE 18: ANHYDROUS AEROSOL FORMULA

The formula tested comprises a base manufactured according to the method described hereinbelow and containing the ingredients mentioned in the following table:

| Phase | Ingredients | Preparation Invention Example 18 |
|---|---|---|
| P1 | Isopropyl palmitate[1] | 26.13 |
| P1 | Isododecane[2] | 15 |
| P1 | Coconut oil [3] | 7 |
| P2 | Disteardimonium hectorite [4] | 2.6 |
| P3 | Propylene carbonate[5] | 0.87 |
| P4 | Magnesium chloride[6] | 20 |
| P4 | Citric Acid[7] | 2 |
| P4 | Sodium citrate[8] | 6.4 |
| P4 | Dipotassium Phosphate[9] | 20 |

[1] sold under the trade name Isopropyl Palmitate by Cognis (BASF)
[2] sold under the trade name Isododecane by Ineos
[3] sold under the trade name HUILE DE COPRAH RAFFINEE GV 24/26 by Sio (ADM)
[4] sold under the trade name Bentone 38VCG by Elementis
[5] sold under the trade name Jeffsol propylene carbonate by Huntsman
[6] MAGNESIUM CHLORIDE6-HYDRATE DR PAUL LOHMANN
[7] sold under the trade name CITRIC ACID ANHYDROUS by CARGILL
[8] sold under the trade name CITRATE TRISODIQUE DIHYDRATE FINE F 6000 by JUNGBUNZLAUER
[9] sold under the trade name DI-POTASSIUM HYDROGEN PHOSPHATE ANHYDROUS EMPROVE EXP PH EU R, BP, E340 by MERCK The phase P1 was mixed with stirring. The phase P2 was slowly introduced into the phase P1 then allowed to swell for five minutes. P3 was introduced. This was strongly stirred until good homogenization was obtained. Then the phase P4 was added little by little until homogenization. The formula is stable at least 24 hours.

EXAMPLES 19 TO 24: COMPOSITION A AND COMPOSITION B SEPARATELY IN AQUEOUS GEL FORMULA

Compositions A19, A20 and B5, B6, B7, B8 tested comprise a base manufactured according to the method described hereinbelow and containing the ingredients mentioned in the following table. The application mode of these compositions is described in example 25:

| Phase | Ingredients | Preparation Invention Composition B5 |
|---|---|---|
| P1 | Water | QSP |
| P2 | Hydroxyethyl Cellulose [2] | 0.75 |
| P3 | Dipotassium Phosphate [6] | 7.7 |
| P4 | Phenoxy ethanol [7] | 0.5 |

| Phase | Ingredients | Preparation Invention Composition B6 |
|---|---|---|
| P1 | Water | QSP |
| P2 | Hydroxyethyl Cellulose [2] | 0.75 |
| P3 | Disodium Phosphate [8] | 7.7 |
| P4 | Phenoxy ethanol [7] | 0.5 |

| Phase | Ingredients | Preparation Invention Composition B7 |
|---|---|---|
| P1 | Water | QSP |
| P2 | Sclerotium Gum [1] | 1 |
| P3 | Dipotassium Phosphate [6] | 7.7 |
| P4 | Phenoxy ethanol [7] | 0.5 |

| Phase | Ingredients | Preparation Invention Composition B8 |
|---|---|---|
| P1 | Water | QSP |
| P2 | Sclerotium Gum [1] | 1 |
| P3 | Disodium Phosphate [8] | 7.7 |
| P4 | Phenoxy ethanol [7] | 0.5 |

| Phase | Ingredients | Preparation Invention Composition A19 |
|---|---|---|
| P1 | Water | QSP |
| P2 | Hydroxyethyl Cellulose [2] | 0.75 |
| P3 | Magnesium chloride [3] | 10 |
| P3 | Citric Acid [4] | 1 |
| P3 | Sodium citrate [5] | 3.2 |
| P4 | Phenoxy ethanol [7] | 0.5 |

| Phase | Ingredients | Preparation Invention Composition A20 |
|---|---|---|
| P1 | Water | QSP |
| P2 | Sclerotium Gum [1] | 1 |
| P3 | Magnesium chloride [3] | 10 |
| P3 | Citric Acid [4] | 1 |
| P3 | Sodium citrate [5] | 3.2 |
| P4 | Phenoxy ethanol [7] | 0.5 |

[1] sold under the trade name AMIGEL GRANULE by ALBAN MULLER
[2] sold under the trade name NATROSOL 250 HHR PC by ASHLAND
[3] MAGNESIUM CHLORIDE6-HYDRATE DR PAUL LOHMANN
[4] sold under the trade name CITRIC ACID MONOHYDRATE by CITURGIA BIOCHEMICALS
[5] sold under the trade name CITRATE TRISODIQUE DIHYDRATE FINE F 6000 by JUNGBUNZLAUER
[6] sold under the trade name DI POTASSIUM HYDROGEN PHOSPHATE ANHYDROUS EMPROVE EXP PH E R, BP, E340 by MERCK
[7] sold under the trade name SEPICIDE LD by SEPPIC
[8] sold under the trade name DISODIUM PHOSPHATE by BK GIULINI CHEMIE For each composition A19, A20 and B5, B6, B7, B8 the protocol is as follows: The phase P2 was introduced into the phase P1 with stirring. Once the mixture was homogeneous, the phase P3 was added with stirring. Then phase P4 was introduced with stirring. The formulas are at least 24 hours.

EXAMPLE 25: METHOD OF APPLICATION OF THE COMPOSITIONS A AND B ACCORDING TO THE INVENTION

1) Aqueous Formulas:

Each aqueous composition A1 to A16, A19 and A20 of the examples hereinabove can be applied with one of the aqueous compositions B1 to B8.

For this, the method of application can comprise:
- the mixing just before use of at least one composition A chosen from A1 to A16, A19 and A20, with a compositions B chosen from B1 to B6, followed by the application of the resulting mixture on the surface of the skin;
- application on the surface of the skin, at the same time (simultaneously) or one after the other (sequentially), of at least one composition A chosen from A1 to A16, A19 and A20, and of at least one composition B chosen from B1 to B8.

The composition A chosen from A1 to A16, A19 and A20, and the composition B chosen from B1 to B8, can be present in two separate supports, or in the same support.

2) Anhydrous Formula:

Typically, the anhydrous composition of the example 18 already contains the mixture of cation $X^{n+}$, of anion $Y^{m-}$ and of modulating agent, and is directly applied on the skin.

EXAMPLE 26: ANTIPERSPIRANT CLINICAL EFFECTIVENESS

Method: a gravimetric test was conducted with the compositions A11 and B3 of the example 11 in order to measure their antiperspirant effectiveness, compared to a control formula containing water. In sum, after a "wash-out" period of three weeks, thirty-four subjects were treated for 4 days twice a day on the underarm zone with 400 µl of each composition applied one after the other (composition A11 then composition B3) with a slight massage between the two. Twenty-four hours after the last application, the volunteers were subjected to a sauna at 38° C. and 35% RH (humidity) for forty minutes, during which their underarm sweat was collected using cotton pads that were tared beforehand which were weighed after collection Results:

A reduction of 8.9% in the quantity of sweat was observed for the group treated according to the invention compared to the control group with a significance p<0.017.

The invention claimed is:

1. A cosmetic method for the treatment of human perspiration and optionally body odors resulting from the perspiration, comprising applying to the surface of at least one underarm of a human at least one cation $X^{n+}$ of valency n, at least one anion $Y^{m-}$ of valency m and at least one modulating agent,
    wherein the at least one cation $X^{n+}$ is in the form of a water soluble salt that is magnesium chloride, and is present in a composition A in an amount between 1% and 25% by weight of the total weight of the composition A;
    the at least one anion $Y^{m-}$ is chosen from $PO_4^{3-}$, polyphosphates, $PO_3^{3-}$ or $HPO_4^{2-}$ and is present in a composition B in an amount between 0.7% and 25% by weight of the total weight of the composition B, the compositions A and B being different; and
    the at least one modulating agent is a mixture of citric acid in free form and sodium citrate, and is present in the composition A and/or in the composition B in an amount between 0.03 and 10% by weight,
    wherein the composition A and/or the composition B comprises water,
    wherein the molar ratio between the magnesium chloride and the at least one anion $Y^{m-}$ varies from 4:1 to 1:4, and/or the weight ratio between the at least one modulating agent and magnesium chloride is between 0.01 and 1.5, and
    wherein when compositions A and B are combined, the resulting composition has a pH ranging from 5 to 8,
    provided that when the composition A comprising the at least one cation $X^{n+}$ and the composition B are applied sequentially, the composition A and the composition B are applied on the surface of the at least one underarm with an interval of time ranging from 1 second to 1 hour;
    and whereby the composition provides increased precipitation reaction time as compared to compositions having the same components and amounts except for the modulating agent.

2. The method according to claim 1, comprising:
    (i) either the mixing just before use of the composition A and of the composition B, said compositions A and B being packaged separately, followed by the application of the resulting mixture on the surface of the at least one underarm;
    (ii) or the application on the surface of the skin simultaneously or sequentially of the composition A and of the composition B packaged separately;
    (iii) or the application on the surface of the at least one underarm of a composition comprising in the same support the composition A and of the composition B;
    said composition A comprising in a cosmetically acceptable medium at least one salt of cation $X^{n+}$ of valency n, the salt being different from a salt having anion $Y^{m-}$ of valency m; and
    said composition B comprising in a cosmetically acceptable medium at least one salt of anion $Y^{m-}$ of valency m, the salt being different from a salt having cation $X^{n+}$ of valency n.

3. The method according to claim 1, where the at least one anion $Y^{m-}$ is $HPO_4^{2-}$.

4. The method according to claim 1, where the at least one anion $Y^{m-}$ is in the form of a salt chosen from:
    alkali metal salts, and
    ammonium salts.

5. The method according to claim 1, where the at least one anion $Y^{m-}$ is a sodium or potassium salt.

6. The method according to claim 1, where the at least one anion $Y^{m-}$ is in the form of a salt chosen from $Na_3PO_3$, $Na_2HPO_4$, $NaH_2PO_4$, $Na_2H_2P_2O_7$, $Na_4P_2O_7$, $K_2HPO_4$, $KH_2PO_4$, $K_2H_2P_2O_7$ or $K_4P_2O_7$.

7. The method according to claim 1, where the molar ratio between the at least one cation $X^{n+}$ and the at least one anion $Y^{m-}$ varies from 4:1 to 1:4.

8. The method according to claim 1, where the total concentration of the at least one cation $X^{n+}$ and of the at least one anion $Y^{m-}$ varies from 2 to 50% by weight of the total weight of the compositions A and B.

9. The method according to claim 1, wherein the composition A comprising the at least one cation $X^{n+}$ and the composition B comprising the at least one anion $Y^{m-}$ are packaged separately and applied simultaneously or sequentially on the surface of the at least one underarm.

10. The method according to claim 2, wherein the mixing (i) of the composition A and of the composition B, or the simultaneous or sequential application (ii) of the composition A and of the composition B, or the application of a composition comprising in the same support the composition A and the composition B (iii) gives a composition having a pH between 5 and 8.

* * * * *